(12) United States Patent
Hundley et al.

(10) Patent No.: US 10,197,708 B2
(45) Date of Patent: Feb. 5, 2019

(54) STRUCTURES HAVING SELECTIVELY METALLIZED REGIONS AND METHODS OF MANUFACTURING THE SAME

(71) Applicant: HRL Laboratories, LLC, Malibu, CA (US)

(72) Inventors: Jacob M. Hundley, Newbury Park, CA (US); Zak C. Eckel, Calabasas, CA (US); Sophia S. Yang, Los Angeles, CA (US); Alan J. Jacobsen, Woodland Hills, CA (US); William Carter, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 474 days.

(21) Appl. No.: 14/462,306

(22) Filed: Aug. 18, 2014

(65) Prior Publication Data
US 2015/0176132 A1    Jun. 25, 2015

Related U.S. Application Data

(60) Provisional application No. 61/918,540, filed on Dec. 19, 2013.

(51) Int. Cl.
| | | |
|---|---|---|
| *B05D 3/10* | (2006.01) | |
| *G02B 1/12* | (2006.01) | |
| *G02B 1/14* | (2015.01) | |

(52) U.S. Cl.
CPC ............... *G02B 1/12* (2013.01); *G02B 1/14* (2015.01); *Y10T 428/24149* (2015.01)

(58) Field of Classification Search
CPC . C23C 18/22; C23C 18/1641; C23C 18/1603; C23C 18/1605; C23C 18/1607;
(Continued)

(56) References Cited

U.S. PATENT DOCUMENTS

| 3,640,765 A | 2/1972 | DiStefano et al. |
| 3,640,789 A * | 2/1972 | Hepfer ............... C23C 18/1641 |
| | | 156/150 |

(Continued)

FOREIGN PATENT DOCUMENTS

| CN | 101750884 A | 6/2010 |
| JP | 54-043275 A | 4/1979 |

(Continued)

OTHER PUBLICATIONS

Farrer, Selective functionalization of 3-D polymer microstructures, 2006, J.Am. Chem. Soc,vol. 128, p. 1796-1797.*
Schaedler, Ultralight metallic microlattices, Nov. 2011, Science, vol. 334, p. 962-965.*
Wu, Three-dimensional selective growth of nanoparticles on a polymer microstructure, Jun. 2009, Nanotechnology, vol. 20, p. 1-4.*
(Continued)

*Primary Examiner* — Dah-Wei D. Yuan
*Assistant Examiner* — Nga Leung V Law
(74) *Attorney, Agent, or Firm* — Lewis Roca Rothgerber Christie LLP

(57) ABSTRACT

Methods of manufacturing a structure having at least one plated region and at least one unplated region. The method includes plating a metal on a polymer structure having a first region accepting the metal and a second region unreceptive to the metal plating. The first region may include fully-cured polymer optical waveguides and the second region may include partially-cured polymer optical waveguides. The first region may include a first polymer composition and the second region may include a second polymer composition different than the first polymer composition.

16 Claims, 14 Drawing Sheets

(58) Field of Classification Search
CPC ............ C23C 18/1608; C23C 18/1612; C23C 18/1614
USPC ................. 427/304, 306, 443.1, 98.8, 307
See application file for complete search history.

(56) References Cited

U.S. PATENT DOCUMENTS

| | | | |
|---|---|---|---|
| 3,775,121 A | | 11/1973 | Sharp |
| 3,790,400 A | * | 2/1974 | Kuzmik ................ C23C 18/28 106/1.11 |
| 4,486,463 A | | 12/1984 | Rubner et al. |
| 4,594,311 A | | 6/1986 | Frisch et al. |
| 4,746,536 A | | 5/1988 | Ichikawa et al. |
| 5,075,037 A | | 12/1991 | Morgan et al. |
| 5,084,299 A | | 1/1992 | Hirsch et al. |
| 5,127,998 A | | 7/1992 | Cole, Jr. et al. |
| 6,863,936 B2 | | 3/2005 | Chen et al. |
| 7,382,959 B1 | * | 6/2008 | Jacobsen ............... B82Y 20/00 385/129 |
| 7,653,279 B1 | | 1/2010 | Jacobsen |
| 7,658,810 B2 | | 2/2010 | Endres et al. |
| 8,017,193 B1 | | 9/2011 | Zhou et al. |
| 8,320,727 B1 | | 11/2012 | Jacobsen et al. |
| 2002/0186935 A1 | | 12/2002 | Inui et al. |
| 2003/0087049 A1 | | 5/2003 | Hachenberg et al. |
| 2004/0091818 A1 | | 5/2004 | Winstead et al. |
| 2009/0208164 A1 | | 8/2009 | Kim et al. |
| 2009/0314929 A1 | | 12/2009 | Lee et al. |
| 2010/0159398 A1 | * | 6/2010 | Rock ..................... G03F 7/095 430/322 |
| 2010/0291466 A1 | | 11/2010 | Rock et al. |
| 2011/0195363 A1 | | 8/2011 | Rock et al. |
| 2012/0315429 A1 | | 12/2012 | Stamp et al. |

FOREIGN PATENT DOCUMENTS

| | | |
|---|---|---|
| WO | WO 1996/030202 A1 | 10/1996 |
| WO | WO 2000/024559 A1 | 5/2000 |
| WO | WO 2010/147695 A1 | 12/2010 |
| WO | WO 2013/010108 A1 | 1/2013 |

OTHER PUBLICATIONS

International Search Report and Written Opinion for PCT Application No. PCT/US2014/071316; dated Jun. 30, 2015, 16 pages.
Farrer et al., "Selective Functionalization of 3-D Polymer Microstructures," J. Am. Chem. Soc., 128:1796-1797, 2006.
Schaedler et al., "Ultralight Metallic Microlattices," Science, 334:962-965, Nov. 18, 2011.
Takeyasu et al., "Fabrication of 3D metal/polymer microstructures by site-selective metal coating," Appl. Phys., A 90:205-209, 2008.
Wu et al., "Three-dimensional selective growth of nanoparticles on a polymer microstructure," Nanotechnology, 20:1-4, 2009.
U.S. Appl. No. 13/584,108, filed Aug. 13, 2012, entitled "Ultra-Light Hollow-Tube Micro-Lattice with Reversible Deformation Capability," 37 pages.
Invitation to Pay Additional Fees and, Where Applicable, Protest Fee for International Application No. PCT/US2014/071316; dated Mar. 30, 2015, 7 pages.
Evans et al., "Concepts for enhanced energy absorption using hollow micro-lattices," International Journal of Impact Engineering, pp. 1-13, 2010.
Schaedler et al., "Designing Metallic Microlattices for Energy Absorber Applications**," Advanced Engineering Materials, 16(3):276-283, 2014.
International Preliminary Report on Patentability for International Application No. PCT/US2014/071316, dated Jun. 30, 2016, 11 pages.
Extended European Search Report dated Aug. 8, 2017, for corresponding EP Application No. 14872826.4 (8 pages).
Takeyasu, N. et al., "Fabrication of 3D metal/polymer microstructures by site-selective metal coating," *Applied Physics A; Materials Science & Processing*, vol. 90, No. 2, Oct. 26, 2007, pp. 205-209.
CN Office Action for corresponding Chinese Application No. 201480075928.4, dated Jul. 10, 2017 with English Translation (20 pages).
Farrer et al. "Selective Functionalization of 3-D Polymer Microstructures," J. Am. Chem. Soc. 2006, vol. 128, pp. 1796-1797.
Second Chinese Office action for Application No. 201480075928.4, dated Mar. 28, 2018, 10 pages (with English translation).

* cited by examiner

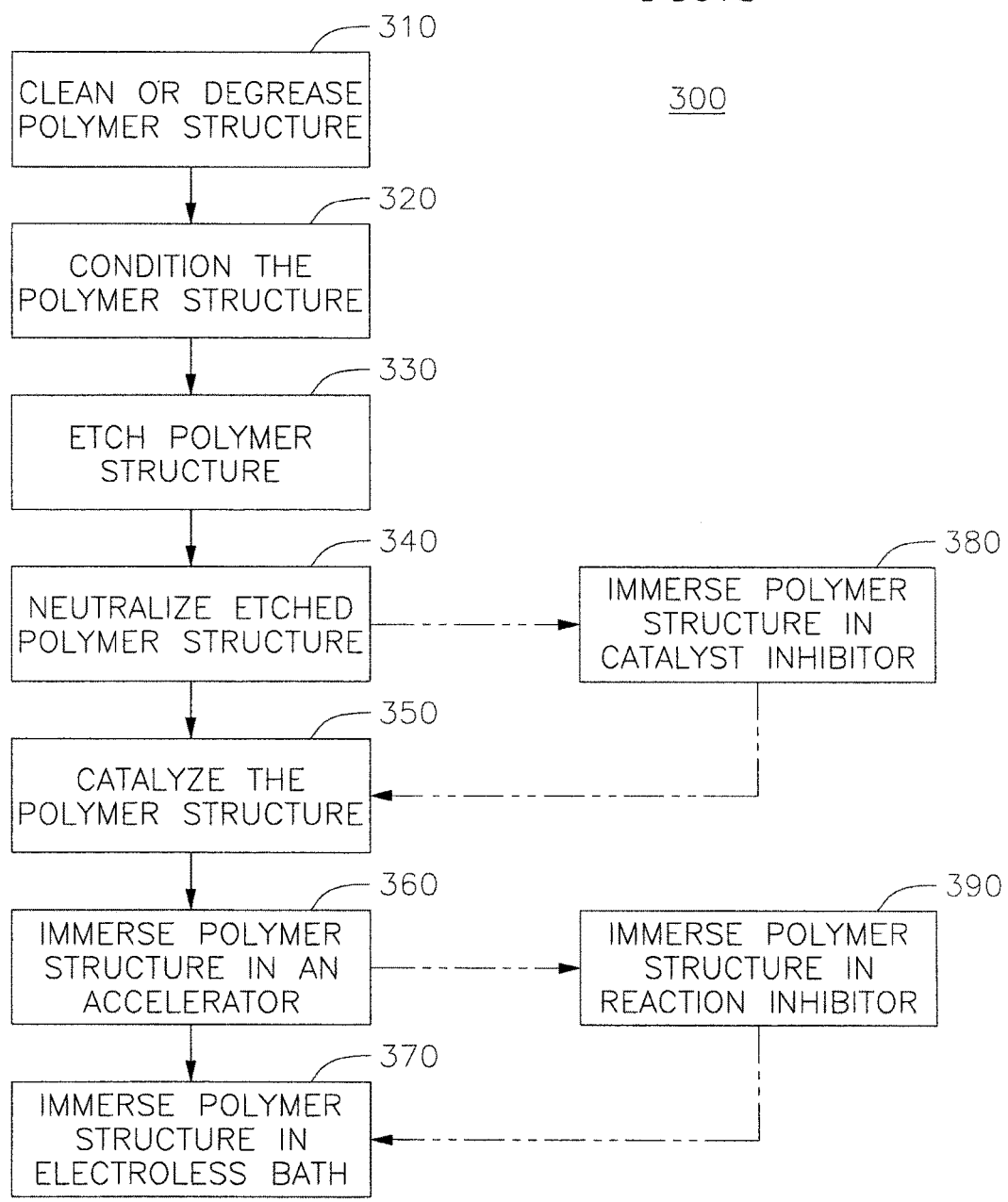

STRUCTURES HAVING SELECTIVELY METALLIZED REGIONS AND METHODS OF MANUFACTURING THE SAME

CROSS-REFERENCE TO RELATED APPLICATION

This application claims priority to and the benefit of U.S. Provisional Application No. 61/918,540, filed Dec. 19, 2013, the entire content of which is incorporated herein by reference.

FIELD

The present invention relates generally to polymer structures and, more particularly, to partially metallized polymer structures.

BACKGROUND

Metallized components are ubiquitous. Components are commonly metallized for aesthetic, structural, conductive, and/or corrosion resistance purposes. Related processes for metallizing components include painting, dipping, electroplating, electroless plating, spraying, sputtering, and laser activation. Processes for metallizing components are typically directed at uniformly coating the component. Non-metallized portions of the component are typically the result of uncontrollable variation, which is indicative of an unsuccessful process and therefore such partially metallized components are typically discarded.

Additionally, related processes for metallizing components are typically limited to line-of-sight coverage of the component. For instance, related metallizing processes may be limited to metallizing only external surfaces of the component. Additionally, related metallizing processes may be restricted to components having limited sizes and geometries (e.g., related metallizing techniques may be limited to the two-dimensional coating of flat components, such as circuit boards). Thus, related metallizing processes may be suitable only for components having limited sizes and architectures.

SUMMARY

Aspects of embodiments of the present disclosure are directed toward various methods for manufacturing a structure having at least one plated region and at least one unplated region. In one embodiment, the method includes plating a metal on a polymer structure having a first region accepting the metal and a second region unreceptive to the metal. The polymer structure may include a plurality of interconnected polymer optical waveguides arranged in a unitary lattice structure. Plating the polymer structure may include conditioning the polymer structure, etching the polymer structure, neutralizing the polymer structure, catalyzing the polymer structure, immersing the polymer structure in an accelerator, and immersing the polymer structure in an electroless bath. Plating the polymer structure may include a catalyst poisoning method, an inhibition of metal reaction method, an over-etched polymer surface method, an increased etch rate-post process method, an uncured surface inhibition of plating method, or an etch resistant polymer-prevention of catalyst deposition method. The first region may include fully-cured, cross-linked polymer optical waveguides and the second region may include partially-cured polymer optical waveguides. The first region may include a first polymer composition, and the second region may include a second polymer composition different than the first polymer composition.

The method may also include immersing the polymer structure in a catalyst inhibitor that deposits onto the second region of the polymer structure and is repelled by the first region of the polymer structure. The method may also include immersing the polymer structure in a reaction inhibitor that deposits onto the second region of the polymer structure and is repelled by the first region of the polymer structure. The method may also include etching the polymer structure. The first region of the polymer structure may etch at a first rate and the second region of the polymer structure may etch at a second rate different than the first rate. The method may also include forming the polymer structure by irradiating one or more photo-monomers with a series of light beams. The polymer structure may include a series of interconnected polymer optical waveguides arranged in a unitary lattice structure. The method may also include forming the polymer structure by irradiating a volume of a first photo-monomer with a series of light beams to form the first region of the polymer structure and irradiating a volume of a second photo-monomer with a series of light beams to form the second region of the polymer structure. The method may also include forming the polymer structure by an additive manufacturing process, such as stereolithography, digital light processing, fused deposition, or selective laser sintering.

In another embodiment, the method includes irradiating a volume of a first photo-monomer with a series of light beams to form a first region of a polymer structure and irradiating a volume of a second photo-monomer different than the first photo-monomer with a series of light beams to form a second region of the polymer structure coupled to the first region of the polymer structure. One of the first and second regions of the polymer structures accepts metal plating and the other one of the first and second regions of the polymer structure rejects metal plating. The method may also include plating the first or second region of the polymer structure that accepts metal plating. The method may also include metal plating the other one of the first and second regions of the polymer structure and removing the polymer structure by etching to form a plurality of interconnected hollow struts.

The method may also include lifting the first region of the polymer structure out of a reservoir containing an unpolymerized volume of the first photo-monomer, filling the reservoir with the second photo-monomer, and lowering the first region of the polymer structure into the reservoir to contact the second photo-monomer before irradiating the second photo-monomer with the light beams. The method may also include removing an unpolymerized volume of the first photo-monomer from a reservoir containing the first region of the polymer structure and filling the reservoir with the second photo-monomer to a height greater than a height of the first region of the polymer structure. Irradiating the second photo-monomer may include directing the light beams through the first region of the polymer structure such that the second region of the polymer structure extends upward from an upper end of the first region of the polymer structure. The method may also include removing an unpolymerized volume of the first photo-monomer from a reservoir containing the first region of the polymer structure and filling the reservoir with the second photo-monomer such that at least a portion of the first region of the polymer structure is submerged in the second photo-monomer. Irradiating the second photo-monomer may include directing the light beams through the first region of the polymer structure to form a plurality of thin polymer shells on the portion of the first region of the polymer structure submerged in the second photo-monomer. The first and second photo-monomers may be immiscible monomers, and the first photo-monomer may be layered on top of the second photo-monomer. Irradiating the first photo-monomer may include directing the light beams through a series of apertures defined in a first mask and irradiating the second photo-monomer may include directing the light beams through a plurality of apertures defined in a second mask.

Aspects of embodiments of the present disclosure are also directed toward various embodiments of a partially metallized structure. In one embodiment, the partially metallized structure includes a lattice structure having a plurality of layers. Each layer includes an array of unit cells each having a series of interconnected polymer struts. The partially metallized structure also includes at least one metallized region covering the polymer struts and at least one region of exposed polymer struts. The at least one metallized region may include a series of disconnected plated regions. The at least one metallized region may include a series plated regions covering a series of nodes defined at intersections between the polymer struts. The at least one metallized region may extend completely across one of the layers. The at least one metallized region may include one or more struts extending completely across a thickness of the lattice structure.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 3 is a flowchart illustrating tasks of metallizing the one or more regions of the polymer structure of FIG. 2C that are receptive to metal plating according to one embodiment of the present disclosure;

DETAILED DESCRIPTION

Figure 1A:
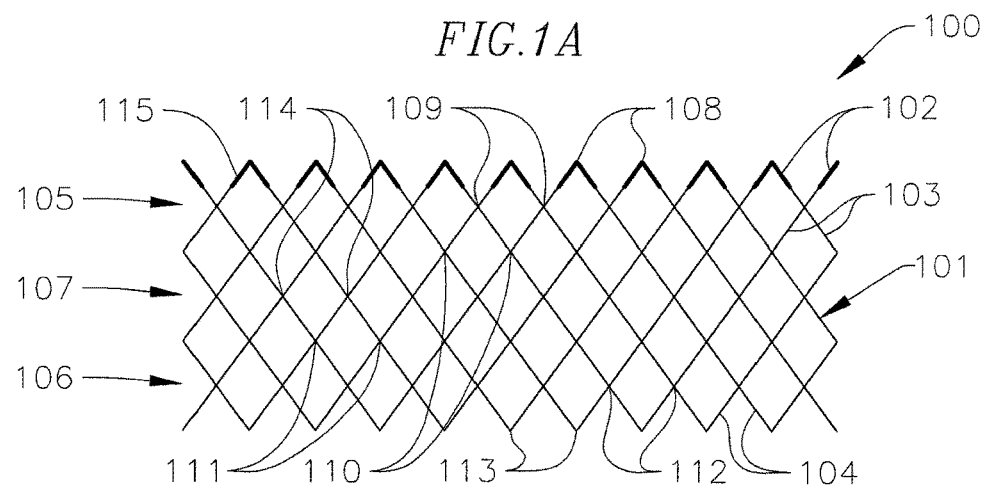
FIGS. 1A-1K are side views of partially metallized three-dimensional structures according to various embodiments of the present disclosure.
Figure 1B:
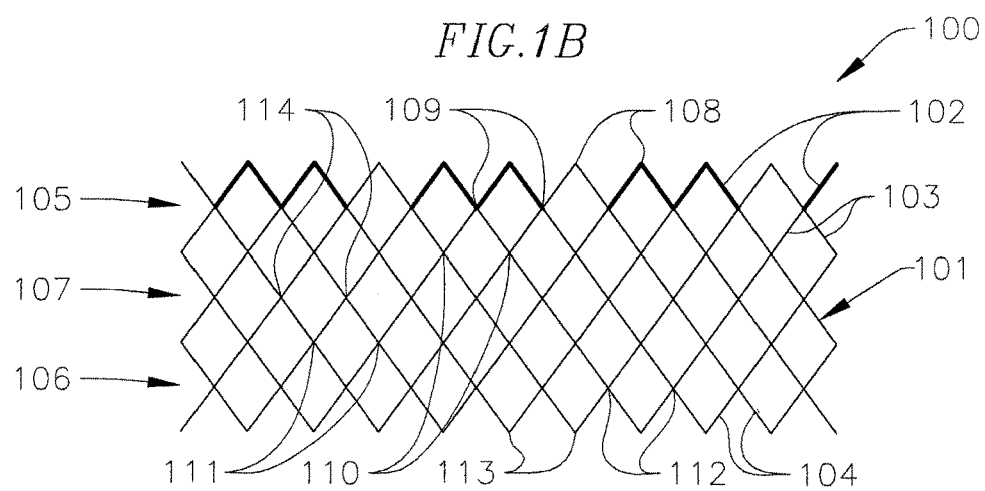
Figure 1C:
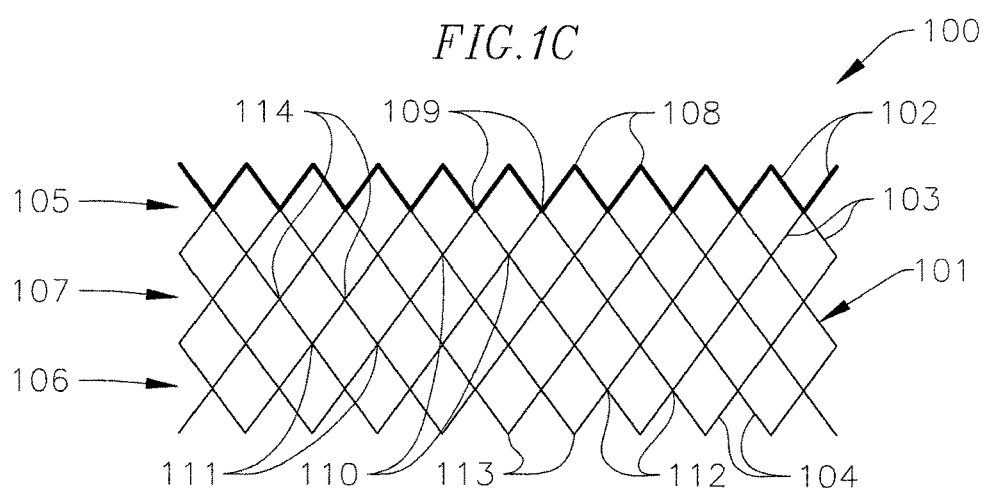

The present disclosure is directed to various embodiments of a three-dimensional structure having locally or partially metallized regions. The partially metallized structures of the present disclosure may be incorporated into any desired structure, such as, for instance, aerospace or automotive vehicles. The partially metallized structures of the present disclosure may also be used for any suitable purposes, such as, for instance, lightweight localized structural reinforcement, corrosion resistance (e.g., the metal coated regions may prevent moisture ingress or chemical corrosion), aesthetic properties, variable wave propagation properties, or energy absorption.

The present disclosure is also directed to various methods of manufacturing a partially metallized structure by selectively metallizing regions of a three-dimensional polymer structure having one or more regions accepting metal plating from an electro- or electroless-plating process and one or more regions rejecting or inhibiting the metal plating. The methods may include forming the polymer structure out of two or more dissimilar polymer compositions, one of which is configured to accept plating and one of which is configured to reject plating. The methods may include selectively fully curing regions of a partially cured three-dimensional polymer structure such that the fully-cured regions of the polymer structure are configured to accept plating and the remaining partially-cured regions of the polymer structure are configured to reject or inhibit plating.

With reference now to FIGS. 1A-1K, partially metallized three-dimensional structures 100 according to various embodiments of the present disclosure each include a polymer structure 101 having one or more metallized regions 102 and one or more non-metallized regions 103 (e.g., regions of exposed polymer structure). In one embodiment, the non-metallized regions 103 of the polymer structures 101 are configured to reject or inhibit metal plating from a plating process such as electro- or electroless plating (e.g., the non-metallized regions 103 of the polymer structures 101 may be metalphobic or otherwise unreceptive to metal plating). Additionally, in one embodiment, regions of the polymer structures 101 corresponding to the metallized regions 102 are configured to accept metal plating from a process such as electro- or electroless plating (e.g., regions of the polymer structures 101 corresponding to the metallized regions 102 may be metalphilic or otherwise receptive to metal plating). In the illustrated embodiments, the polymer structures 101 each include a plurality of interconnected polymer struts or truss elements 104 (e.g., a plurality of interconnected polymer optical waveguides) arranged in a unitary three-dimensional lattice structure. In the illustrated embodiments, the truss elements 104 are arranged and oriented into an upper layer 105, a lower layer 106, and an intermediate or center layer 107 disposed between the upper and lower layers 105, 106, respectively. Each layer 105, 106, 107 includes an array of periodic unit cells (i.e., the unitary lattice structure includes a series of repeating unit cells). In one or more embodiments, the truss elements 104 may be arranged and oriented into any suitable configuration, such as, for instance, arrays of hexahedral or octahedral unit cells.

Although in the illustrated embodiment the polymer structure 101 includes three layers 105, 106, 107, in one or more alternate embodiments, the polymer structure 101 may have any other suitable number of layers, such as, for instance, from one to ten layers, depending on the intended application of the partially metallized structure 100. The polymer structure 101 is also referred to herein as "a micro-truss core" or "an ordered three-dimensional microstructure core." The truss elements 104 (e.g., the polymer optical waveguides) may have any suitable spacing, orientation, size, and cross-sectional shape depending upon the desired performance characteristics of the partially metallized structure 100.

Additionally, in the embodiments illustrated in FIGS. 1A-1K, the upper layer 105 of the polymer structure 101 includes a plurality of upper nodes 108, intermediate nodes 109, and lower nodes 110 defined where the truss elements 104 in the upper layer 105 cross or intersect. Similarly, the lower layer 106 of the polymer structure 101 includes a plurality of upper nodes 111, intermediate nodes 112, and lower nodes 113 defined where the truss elements 104 in the lower layer 106 cross or intersect. The intermediate layer 107 also includes a plurality of nodes 114 defined where the truss elements 104 in the intermediate layer 107 cross or intersect.

With reference now to embodiment illustrated in FIG. 1A, the at least one metallized region 102 includes a plurality of disconnected metallized regions 102 disposed along an upper, exterior surface 115 of the polymer structure 101. In the illustrated embodiment, the disconnected metallized regions 102 cover the upper nodes 108 in the upper layer 105 and a portion of the truss elements 104 proximate the upper nodes 108. In the embodiment illustrated in FIG. 1A, the metallized regions 102 covering the portion of the truss elements 104 proximate the upper nodes 108 do not extend completely down to the intermediate nodes 109 in the upper layer 105. Accordingly, the disconnected metallized regions 102 are separated by the non-metallized intermediate nodes 109 in the upper layer 105 and the non-metallized portions of the truss elements 104 in the upper layer 105 proximate to the intermediate nodes 109. In an alternate embodiment illustrated in FIG. 1B, the at least one metallized region 102 includes a series of metallized regions 102 each covering a plurality of struts and nodes in the upper layer 105. In particular, in the embodiment illustrated in FIG. 1B, each metallized region 102 covers two adjacent upper nodes 108, three adjacent intermediate nodes 109, and four adjacent truss elements 104 in the upper layer 105 extending between the metallized upper and intermediate nodes 108, 109. Together, the metallized regions 102 in the embodiment illustrated in FIG. 1B define a series of M-shaped metallized regions in the upper layer 105, although in one or more alternate embodiments, any other suitable portions of the truss elements 104 and the nodes 108, 109 in the upper layer 105 may be metallized. Additionally, in FIG. 1B, the M-shaped metallized regions 102 are separated by non-metallized upper nodes 108 and truss elements 104 in the upper layer 105. In the alternate embodiment illustrated in FIG. 1 C, the at least one metallized region 102 is a continuous layer covering the entire upper, exterior surface 115 of the polymer structure 101 (i.e., the metallized region 102 covers an upper half of the upper layer 105). That is, the metallized region 102 in the embodiment illustrated in FIG. 1C covers the upper and intermediate nodes 108, 109, respectively, in the upper layer 105 and the portions of the truss elements 104 in the upper layer 105 extending between the upper and intermediate nodes 108, 109, respectively.

Figure 1D:
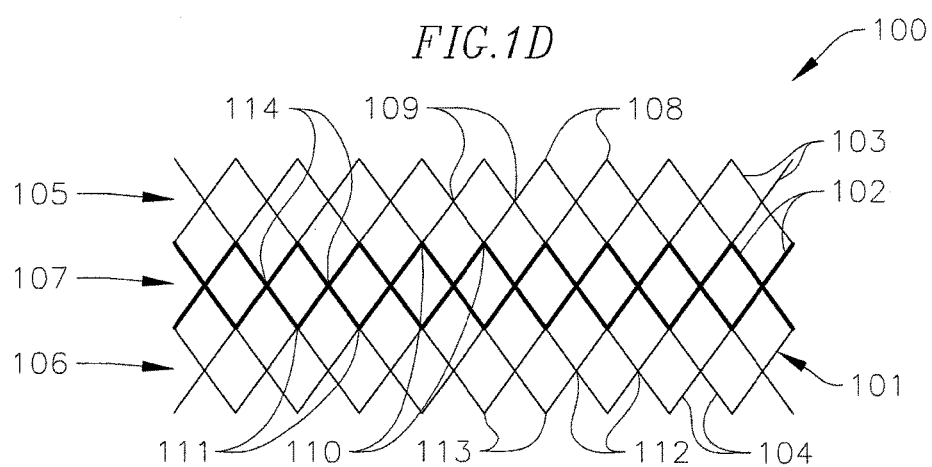

In the embodiment illustrated in FIG. 1D, the metallized region 102 covers and extends across the entire intermediate layer 107 of the polymer structure 101 (i.e., the truss elements 104 in the intermediate layer 107 are completely metallized). In an alternate embodiment illustrated in FIG. 1E, the at least one metallized region 102 covers only a portion of the intermediate layer 107 of the polymer structure 101. In the embodiment illustrated in FIG. 1E, two separate portions of the intermediate layer 107 are metallized, although in one or more alternate embodiments, any other suitable number of portions of the intermediate layer 107 may be metallized. Additionally, in the embodiment illustrated in FIG. 1E, the metallized portions 102 of the intermediate layer 107 are separated by non-metallized portions of the truss elements 104 in the intermediate layer 107.

With reference now to the embodiment illustrated in FIG. 1 F, the at least one metallized region 102 of the polymer structure 101 includes interconnected metallized struts extending between the upper nodes 108 in the upper layer 105 and the lower nodes 113 in the lower layer 106 and forming a hierarchical metallized lattice within the larger non-metallized truss structure. Together, the interconnected metallized struts define a sawtooth pattern across the polymer structure 101.

With reference now to the embodiment illustrated in FIG. 1 G, the at least one metallized region 102 of the polymer structure 101 includes a plurality of periodic, separate metallized struts each extending from a lower node 113 in the lower layer 106 to an upper node 108 in the upper layer 105. In the illustrated embodiment of FIG. 1G, the metallized struts are separated by three non-metallized struts, although in one or more alternate embodiments, the metallized struts may have any other suitable periodicity, such as, for instance, separated by a single non-metallized strut. Additionally, in one or more alternate embodiments, the metallized struts may not extend completely between the upper nodes 108 in the upper layer 105 and the lower nodes 113 in the lower layer 106 (e.g., the metallized struts may extend any other suitable extent or distance between the upper nodes 108 in the upper layer 105 and the lower nodes 113 in the lower layer 106).

With reference now to the embodiment illustrated in FIG. 1 H, the at least one metallized region 102 includes a plurality of separate, disconnected metallized regions covering the intermediate and lower nodes 109, 110, respectively, in the upper layer 105, the nodes 114 in the intermediate layer 107, and the upper and intermediate nodes 111, 112, respectively, in the lower layer 106. Additionally, the metallized regions cover portions of the truss elements 104 proximate the metallized nodes 109, 110, 114, 111, 112 in the upper, intermediate, and lower layers 105, 107, 106. In one or more alternate embodiments, any other suitable selection of nodes of the polymer structure 101 may be metallized depending on the intended application of the partially metallized structure 100 (e.g., each of the nodes may be metallized or only the upper nodes 108 in the upper layer 105 and the lower nodes 113 in the lower layer 106 may be metallized). In an alternate embodiment, the metallized regions may cover only portions of the truss elements extending between the nodes. For instance, in the embodiment illustrated in FIG. 1I, the at least one metallized region 102 includes a plurality of separate, disconnected metallized regions covering portions of the truss elements 104 in each of the upper, intermediate, and lower layers 105, 107, 106. In particular, in the embodiment illustrated in FIG. 1I, the metallized regions cover the portions of the truss elements 104 in the upper layer 105 extending between the upper and intermediate nodes 108, 109, the portions of the truss elements 104 in the intermediate layer 107 extending between the lower nodes 110 in the upper layer 105 and the nodes 114 in the intermediate layer 107, and the portions of the truss elements 104 in the lower layer 106 extending between the upper and intermediate nodes 111, 112 in the lower layer 106. In one or more alternate embodiments, any other suitable selection of truss elements extending between the nodes may be metallized depending on the intended application of the partially metallized structure 100.

Figure 1E:
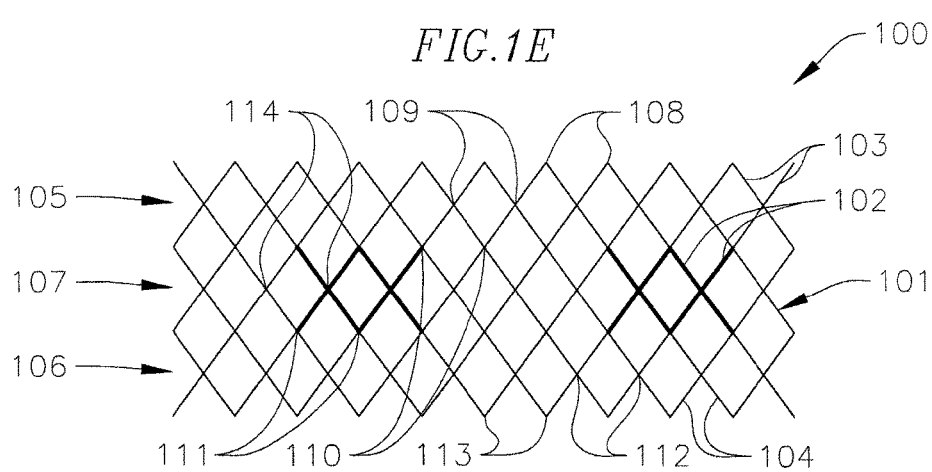
Figure 1F:
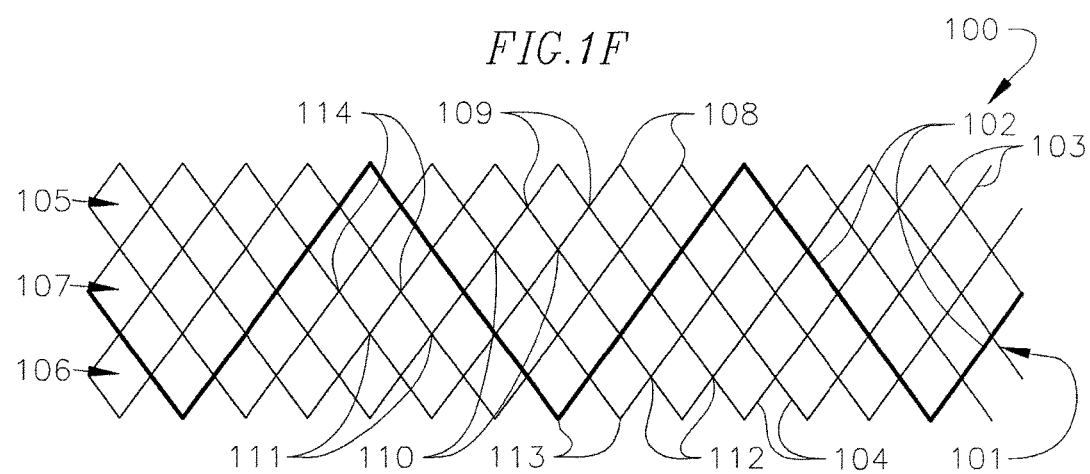
Figure 1G:
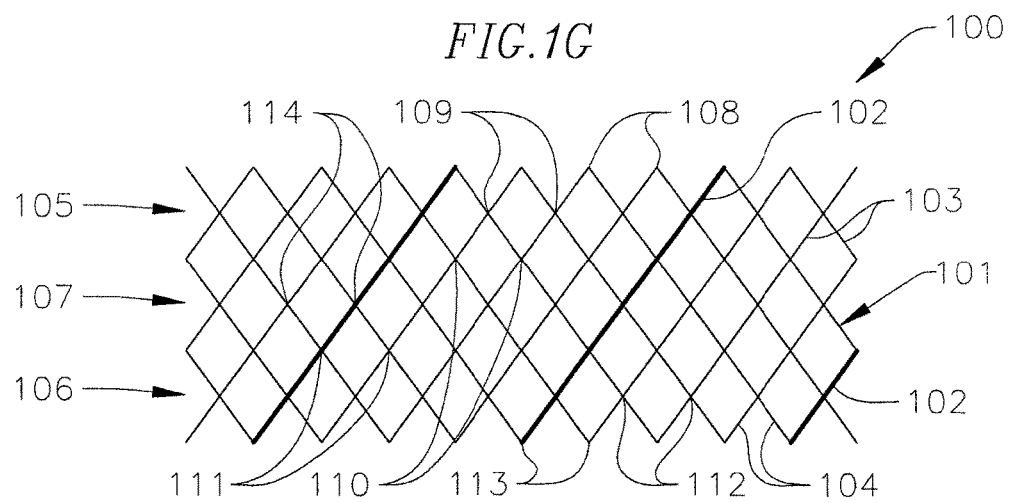
Figure 1H:
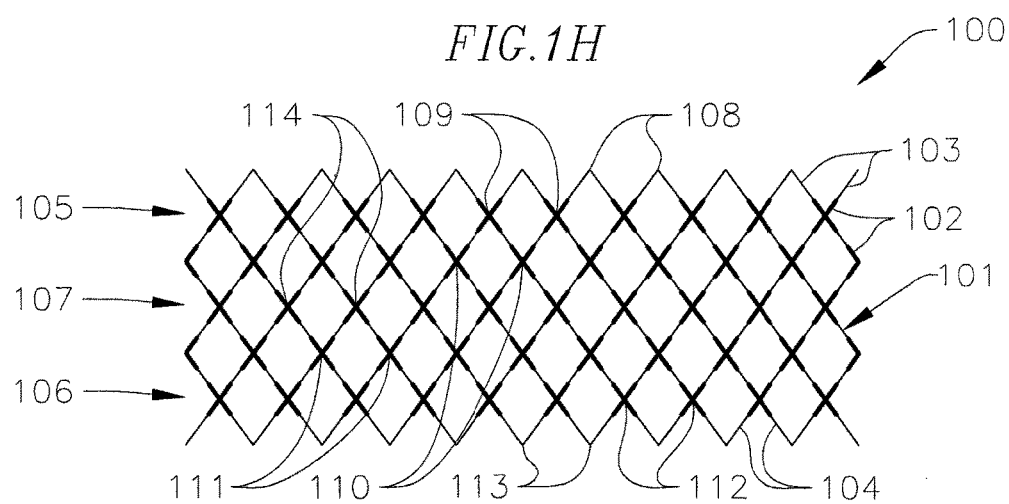
Figure 1I:
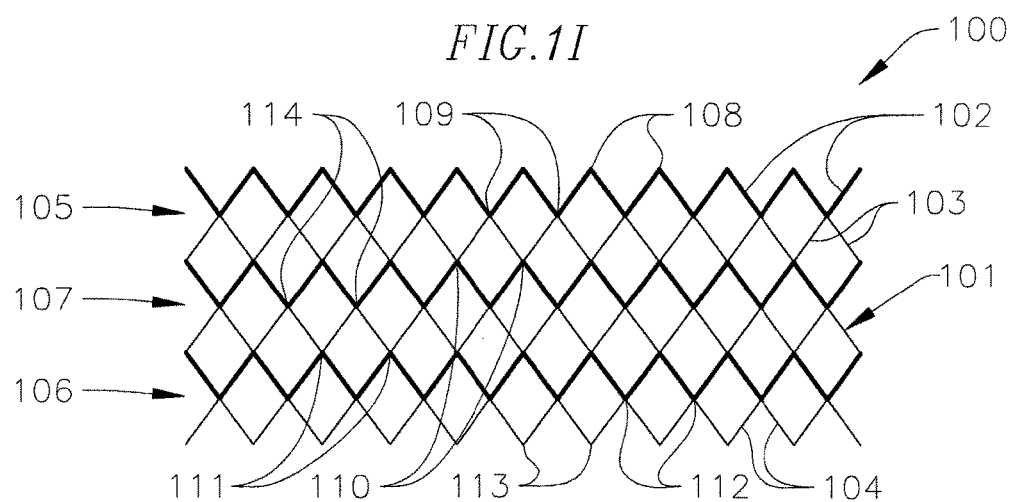
Figure 1J:
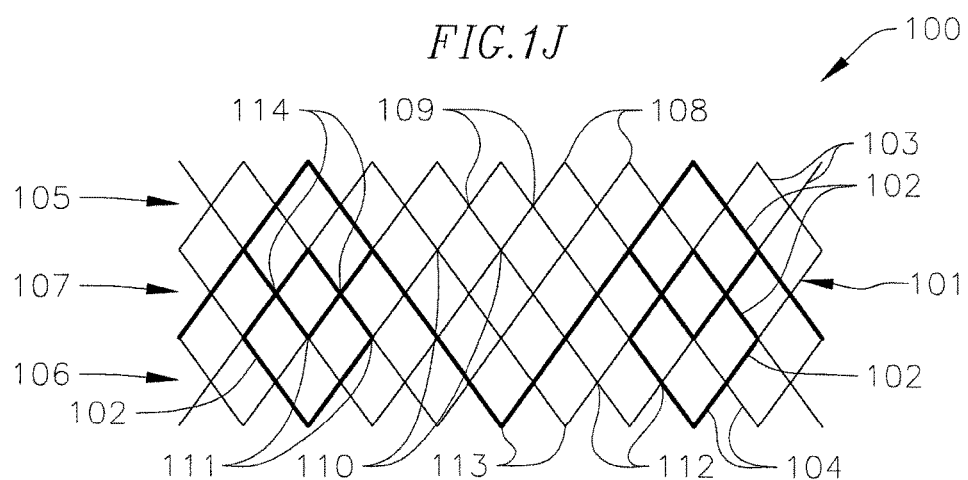
Figure 1K:
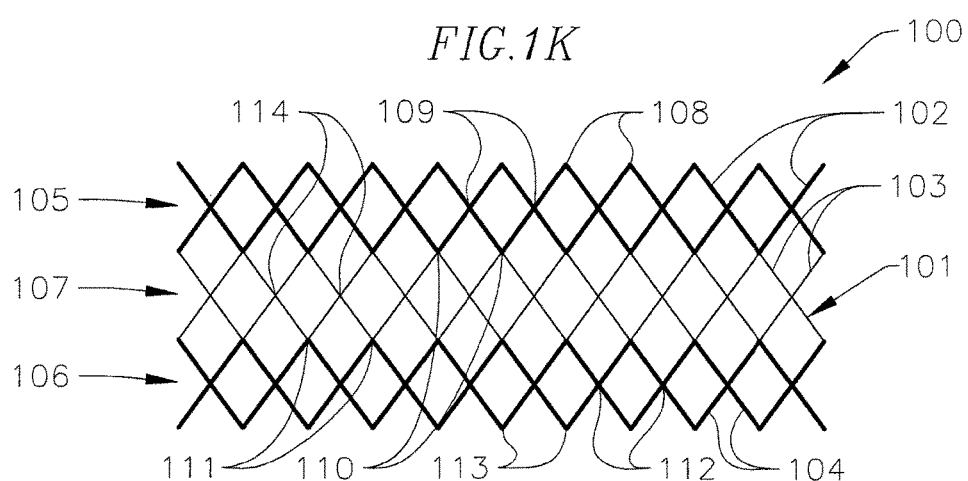

In one or more embodiments, the partially metallized structure 100 may include any combination of the metallized regions described above with reference to FIGS. 1A-1I (i.e., the partially metallized structure 100 may include a hybrid of the metallized regions described above with reference to FIGS. 1A-1I). For instance, in the embodiment illustrated in FIG. 1J, the partially metallized structure 100 includes metallized regions covering portions of the intermediate layer 107 (e.g., as illustrated in FIG. 1E) and interconnected metallized regions covering truss elements 104 extending between upper nodes 108 in the upper layer 105 and lower nodes 113 in the lower layer 106 (e.g., as illustrated in FIG. 1F). In the embodiment illustrated in FIG. 1J, the partially metallized structure 100 also includes metallized regions covering some of the lower nodes 113 in the lower layer 106 and portions of the truss elements 104 proximate the metallized lower nodes 113. In the embodiment of FIG. 1K, the partially metallized structure 100 includes metallized regions covering and extending across the entire upper layer 105 and the entire lower layer 106 (e.g., the truss elements 104 in the upper and lowers layers 105, 106 are completely metallized).

The metallized regions 102 of the partially metallized structures 100 illustrated in FIGS. 1A-1K may include any suitable metal, such as, for instance, copper, nickel, palladium, gold, silver, zinc, cobalt, chromium, platinum, iron, or any combinations thereof.

Figure 2A:
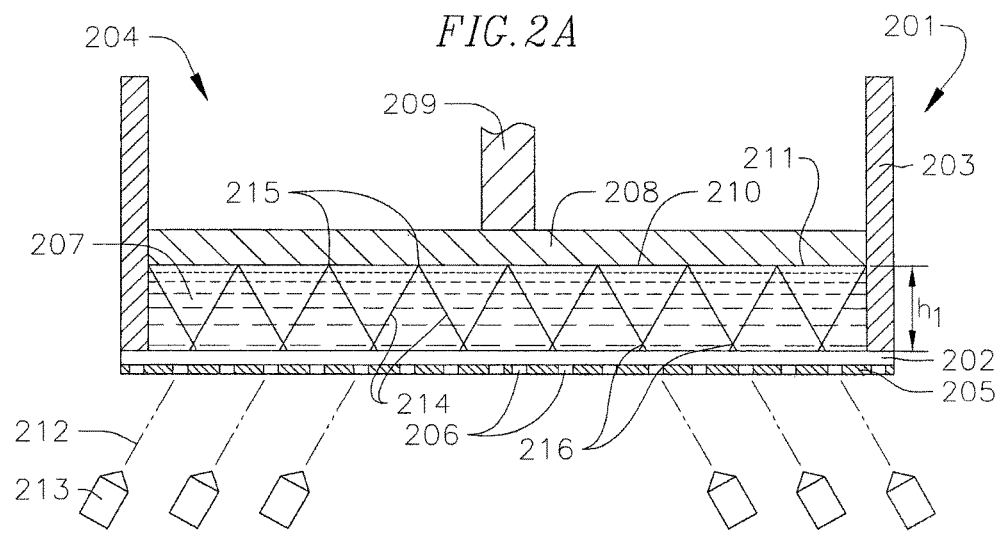
FIGS. 2A-2C illustrate tasks of forming a polymer structure having one or more regions receptive to metal plating and one or more regions unreceptive to metal plating according to one embodiment of the present disclosure.

With reference now to FIGS. 2A-2D, a method of manufacturing a partially metallized structure by metal plating a three-dimensional polymer structure 200 having one or more regions configured to accept the metal plating and one or more regions configured to reject or inhibit the metal plating will now be described. As described in more detail below, the different regions of the polymer structure 200 may be formed from different photo-monomers, which either accept or reject metal plating. With reference now to FIG. 2A, the method includes a task of obtaining or providing a mold 201 having a translucent base 202 and vertical wall or rim 203 extending upward from a periphery of the base 202. Together, the base 202 and the rim 203 of the mold 201 define a chamber or reservoir 204. The base 202 of the mold 201 is translucent to those wavelengths of light that are configured to polymerize a liquid photo-monomer deposited into the reservoir during a subsequent task described below. With continued reference to the embodiment illustrated in FIG. 2A, the method also includes a task of covering the translucent base 202 of the mold 201 with a mask 205. The mask 205 defines a plurality of apertures 206. The mask 205 may define any desired number of apertures 206 and the apertures 206 may have any desired size, shape, and spacing, depending upon the desired characteristics of the polymer structure, as described below in more detail. Additionally, the mask 205 may be made of any suitable material, such as, for instance, biaxially-oriented polyethylene terephthalate.

With continued reference to FIG. 2A, the method also includes a task of filling at least a portion of the reservoir 204 with a volume of a first photo-monomer 207. The first photo-monomer 207 may be filled to any suitable height $h_1$ within the reservoir 204 depending upon the desired properties of the partially metallized structure, as described in more detail below. The first photo-monomer 207 is configured to polymerize when exposed to light within a particular range of wavelengths, such as, for instance, ultraviolet light (i.e., wavelengths between 250 nm and 400 nm). The first photo-monomer 207 may be any suitable kind of monomer configured to polymerize when exposed to light, such as, for instance, urethanes (e.g., polyurethanes), acrylates, methacrylates, or cationic polymers (e.g., photo-cured epoxies). Suitable liquid photo-monomers 207 are described in U.S. Pat. No. 8,017,193, the entire content of which is incorporated herein by reference.

In the embodiment illustrated in FIG. 2A, the method also includes a task of lowering a substrate 208 attached to a moveable platform 209 until a lower surface 210 of the substrate 208 abuts against an upper surface 211 of the volume of the first photo-monomer 207 (i.e., the method may include actuating the moveable platform 209 to lower the substrate 208 into contact with the volume of the first photo-monomer 207). According to an alternate embodiment, the method may include a task of actuating the moveable platform 209 to move the substrate 208 into the desired position and a task of injecting the first photo-monomer 207 into the reservoir 204 through a port in the mold 201 (e.g., a port in the rim 203) until the upper surface 211 of the first photo-monomer 207 contacts the lower surface 210 of the substrate 208.

Still referring to the embodiment illustrated in FIG. 2A, the method includes a task of irradiating the volume of the first liquid photo-monomer 207 in the reservoir 204 with a plurality of light beams 212 (e.g., collimated or substantially collimated ultraviolet light ("UV") beams) from one or more light sources 213. The task of irradiating the photo-monomer 207 includes directing the light beams 212 from the one or more light sources 213 up through the apertures 206 in the mask 205 and through the translucent base 202 of the mold 201. In one embodiment, the task of irradiating the photo-monomer 207 may also include directing the light beams 212 from the one or more light sources 213 off of one or more mirrors and up through the apertures 206 in the mask 205. Regions of the first photo-monomer 207 that are exposed to the light beams 212 cure (i.e., polymerize). The polymerized regions propagate up through the volume of photo-monomer 207 and form a plurality of polymer optical waveguides 214. In one embodiment, the polymer optical waveguides 214 intersect each other and are polymerized together into a unitary structure. The polymer optical waveguides 214 define struts or portions of struts in a first region of the three-dimensional polymer structure 200. Additionally, in the illustrated embodiment, the points at which the polymer optical waveguides 214 formed from the first photo-monomer 207 cross or intersect define upper nodes 215 of the polymer structure 200. In the illustrated embodiment, the polymer optical waveguides 214 also cross or intersect and define a plurality of intermediate nodes 216. Suitable methods for forming polymer optical waveguides are described in U.S. Pat. Nos. 7,653,279 and 7,382,959, the entire content of both of which are incorporated herein by reference.

The length to which the polymer optical waveguides 214 propagate through the volume of the first photo-monomer 207 in the reservoir 204 is a function of several factors, including the size, intensity, and exposure time of the incident light beams 212 and the light absorption/transmission properties of the first photo-monomer 207. Accordingly, in one embodiment, the method includes a task of selecting one or more light sources 213 configured to produce light beams 212 having a suitable intensity and exposing the volume of the first photo-monomer 207 in the reservoir 204 to the light beams 212 for a sufficient duration such that the polymer optical waveguides 214 propagate all the way up through the volume of the first photo-monomer 207 and adhere to the lower surface 210 of the substrate 208.

Figure 2B:
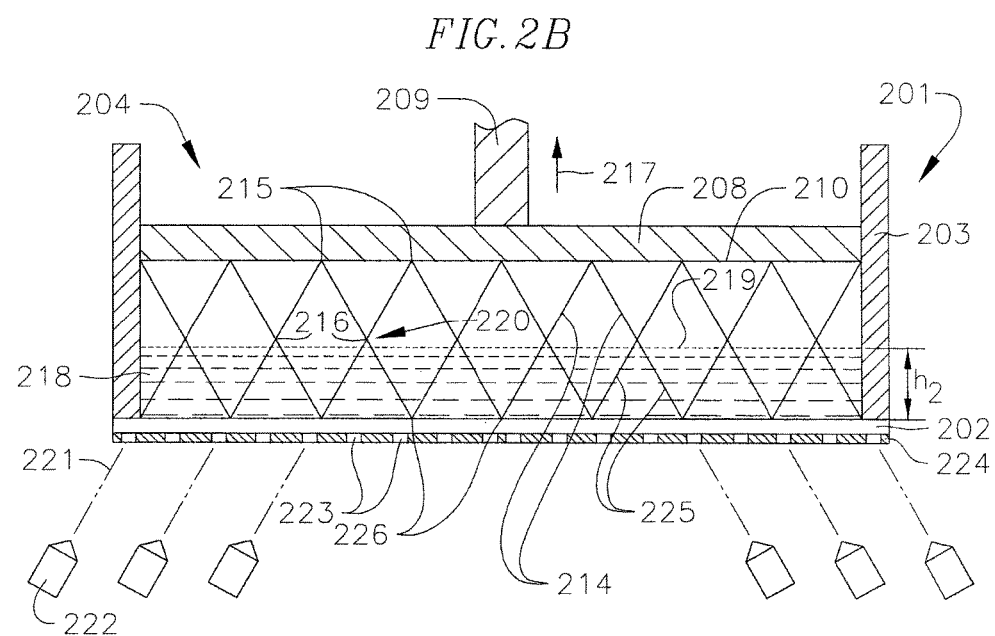

With reference now to the embodiment illustrated in FIG. 2B, the method includes a task of actuating (arrow 217) the moveable platform 209 to raise the substrate 208 until the polymer optical waveguides 214 formed from the first photo-monomer 207 are at least partially lifted out of a remaining volume of unpolymerized photo-monomer 207 in the reservoir 204 (i.e., the method includes lifting the polymer optical waveguides 214 at least partially out of the remaining volume of the first photo-monomer 207 that was not polymerized during the task of irradiating the first photo-monomer 207 with a plurality of light beams 212). The method also includes a task of removing the remaining volume of the first photo-monomer 207 from the reservoir 204 (i.e., removing the remaining volume of the first photo-monomer 207 from the reservoir 204 that was not polymerized during the task of irradiating the first photo-monomer 207 with the light beams 212). The remaining volume of the first photo-monomer 207 may be removed by any suitable process, such as, for instance, draining the remaining volume of the first photo-monomer 207 from the reservoir 204.

Still referring to FIG. 2B, the method also includes a task of filling at least a portion of the reservoir 204 with a volume of a second photo-monomer 218. The second photo-monomer 218 may be filled to any suitable height $h_2$ within the reservoir 204 depending upon the desired properties of the three-dimensional polymer structure 200, as described in detail below. The method further includes a task of actuating the moveable platform 209 to lower the substrate 208 and the polymer optical waveguides 214 attached thereto until a lower end 220 of the polymer optical waveguides 214 formed during the task of irradiating the first photo-monomer 207 contact an upper surface 219 of the volume of the second photo-monomer 218. According to an alternate embodiment, the method may include a task of moving the substrate 208 and the polymer optical waveguides 214 attached thereto into the desired position and a task of injecting the second photo-monomer 218 into the reservoir 204 through a port in the mold 201 (e.g., a port in the rim 203) until the upper surface 219 of the second photo-monomer 218 contacts the lower end 220 of the polymer optical waveguides 214.

With continued reference to FIG. 2B, the method also includes a task of irradiating the volume of the second photo-monomer 218 in the reservoir 204 with a plurality of light beams 221 (e.g., collimated or substantially collimated UV beams) from one or more light sources 222 to form a second portion of the polymer structure 200. The task of irradiating the second photo-monomer 218 includes directing the light beams 221 from the one or more light sources 222 up through apertures 223 in a mask 224. The task of irradiating the second photo-monomer 218 may also include directing the light beams 221 from the one or more light sources 222 off of one or more mirrors and up through the translucent base 202 of the mold 201 and through the apertures 223 in the mask 224. Regions of the second photo-monomer 218 that are exposed to the light beams 221 cure (i.e., polymerize). The polymerized regions propagate up through the volume of the second photo-monomer 218 and form a plurality of polymer optical waveguides 225. The polymer optical waveguides 225 define struts or portions of struts in a second region of the three-dimensional polymer structure 200. Additionally, in the illustrated embodiment, the points at which the polymer optical waveguides 225 formed from the second photo-monomer 218 cross or intersect define a plurality of nodes 226 in the second region of the polymer structure 200. Further, in the illustrated embodiment, the light sources 222 are positioned and oriented such that the polymer optical waveguides 225 of the second region are joined to the polymer optical waveguides 214 of the first region of the polymer structure 200 (i.e., the polymer optical waveguides 214, 225 of the first and second regions are joined together to form a unitary structure).

In one embodiment, the mask 224 used during the task of irradiating the second photo-monomer 218 may be the same as the mask 205 used during the task of irradiating the first photo-monomer 207. In one or more alternate embodiments, the mask 224 used during the task of irradiating the second photo-monomer 218 may be different than the mask 205 used during the task of irradiating the first photo-monomer 207. For instance, the shape, size, spacing, and/or arrangement of the apertures 223 in the mask 224 may differ from the apertures 206 in the mask 205 depending on the desired shape, size, spacing, and arrangement of the polymer optical waveguides 225 formed from the second photo-monomer 218. Accordingly, in one or more embodiments, after the task of irradiating the first photo-monomer 207 and before the task of irradiating the second photo-monomer 218, the method may include a task of replacing the mask 205 with a mask having a different configuration.

Additionally, in the illustrated embodiment, the light beams 221 are directed through the second photo-monomer 218 at the same angles that the light beams 212 were directed through the first photo-monomer 207. In one or more alternate embodiments, the method may include a task of repositioning, reorienting, or replacing the light sources 213 with light sources 222 oriented at different angles such that the light beams 221 are directed through the second photo-monomer 218 at a different angle than the light beams 212 were directed through the first photo-monomer 207. The light sources 222 may be oriented at any desired angles depending on the desired configuration of the polymer optical waveguides 225 in the second region of the polymer structure 200. Accordingly, the polymer optical waveguides 225 in the second region of the polymer structure 200 may have a different shape, size, spacing, and/or arrangement than the polymer optical waveguides 214 in the first region.

Figure 2C:
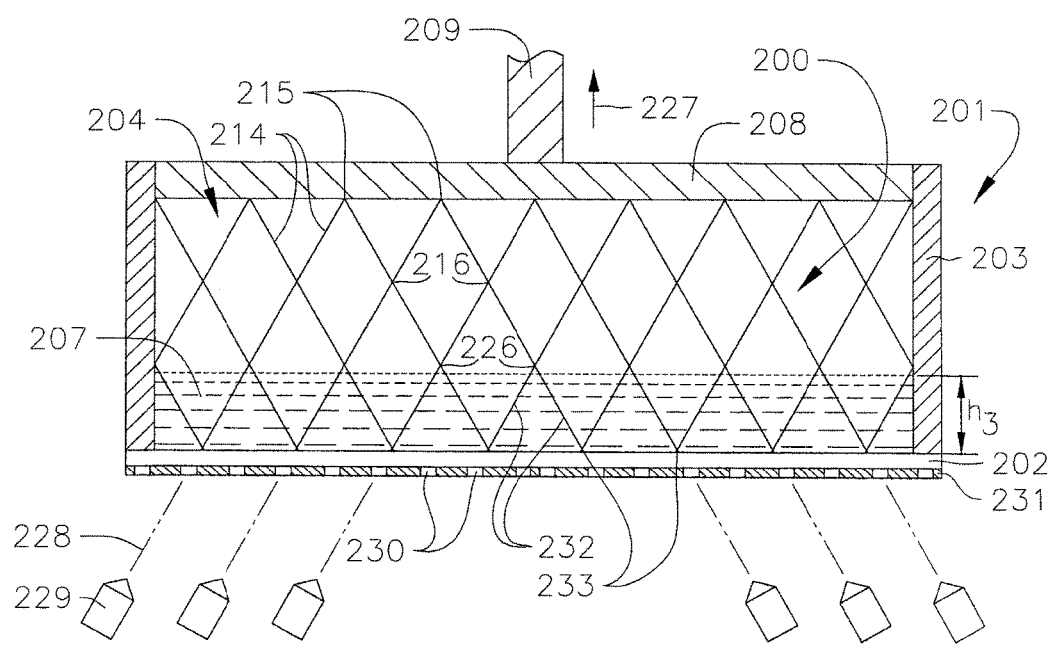

With reference now to the embodiment illustrated in FIG. 2C, the method also includes a task of actuating (arrow 227) the moveable platform 209 to raise the substrate 208 until the polymer optical waveguides 225 formed from the second photo-monomer 218 are at least partially lifted out of an unpolymerized volume of the second photo-monomer 218 in the reservoir 204, removing the unpolymerized volume of the second photo-monomer 218 from the reservoir 204, and at least partially filling the reservoir 204 with a volume of the first photo-monomer 207. The first photo-monomer 207 may be filled to any suitable height $h_3$ within the reservoir 204 depending upon the desired properties of the three-dimensional polymer structure 200. Additionally, although in the illustrated embodiment the height $h_3$ to which the first photo-monomer 207 is filled in the reservoir 204 is substantially equal to the height $h_1$ to which the first photo-monomer 207 was previously filled in the reservoir 204 (see FIG. 2A), in one or more alternate embodiments, the height $h_3$ to which the first photo-monomer 207 is filled in the reservoir 204 may be different than the height $h_1$ to which the first photo-monomer 207 was previously filled in the reservoir 204.

The method also includes a task of irradiating the volume of the first photo-monomer 207 in the reservoir 204 with a plurality of light beams 228 (e.g., collimated or substantially collimated UV beams) from one or more light sources 229 to form a third portion of the polymer structure 200. As described above, the task of irradiating the first photo-monomer 207 includes directing the light beams 228 from the one or more light sources 229 up through apertures 230 in a mask 231. Regions of the first photo-monomer 207 that are exposed to the light beams 228 cure (i.e., polymerize) to form a plurality of polymer optical waveguides 232. The polymer optical waveguides 232 define struts or portions of struts in a third region of the polymer structure 200. Additionally, in the illustrated embodiment, the points at which the polymer optical waveguides 232 formed from the first photo-monomer 207 cross or intersect define lower nodes 233 of the polymer structure 200. Further, in the illustrated embodiment, the light sources 229 are positioned and oriented such that the polymer optical waveguides 232 of the third region are joined to the polymer optical waveguides 225 of the second region of the polymer structure 200 (i.e., the polymer optical waveguides 232, 225 of the third and second regions are joined together to form a unitary structure).

Additionally, the mask 231 used during the task of irradiating the first photo-monomer 207 may be the same or different than the masks 224, 205 used during the previous tasks of irradiating the first and/or second photo-monomers 207, 218 depending on the desired configuration of the polymer optical waveguides 232 in the third region of the polymer structure 200. Further, although in the embodiment illustrated in FIG. 2C the light beams 228 are directed through the first photo-monomer 207 at the same angles that the light beams 221 were directed through the second photo-monomer 218, in one or more alternate embodiments, the method may include a task of repositioning, reorienting, or replacing the light sources 222 with light sources 229 oriented at different angles such that the light beams 228 are directed through the first photo-monomer 207 at a different angle than the light beams 221 were directed through the second photo-monomer 218. The light sources 229 may be oriented at any desired angles depending on the desired configuration of the struts 232 in the third region of the polymer structure 200. Accordingly, the polymer optical waveguides 232 in the third region of the polymer structure 200 may have a different shape, size, spacing, and/or arrangement than the polymer optical waveguides 225 in the second region and/or the polymer optical waveguides 214 in the first region of the polymer structure 200.

The above-described tasks of irradiating the first photo-monomer 207 with light beams 221 to form polymer optical waveguides 214, actuating (arrow 217) the moveable platform 209 to raise the substrate 208 and lift the polymer optical waveguides 214 at least partially out of the unpolymerized first photo-monomer 207 in the reservoir 204, removing the unpolymerized first photo-monomer 207 from the reservoir 204, at least partially filling the reservoir 204 with a second photo-monomer 218, and irradiating the volume of the second photo-monomer 218 with a plurality of light beams 221 to form the polymer optical waveguides 225 may be repeated any suitable number of times to achieve a polymer structure 200 having a desired number of regions or layers and a desired thickness suitable for the intended application and desired properties of the polymer structure 200.

The significance of selecting different photo-monomers during the process of manufacturing the polymer structure 200 will now be described. In one embodiment, the first photo-monomer 207 may be selected such that the polymer optical waveguides 214, 232 formed from the first photo-monomer 207 are configured to reject or inhibit metal plating during an electro- or electroless-plating process, and the second photo-monomer 218 may be selected such that the polymer optical waveguides 225 formed from the second photo-monomer 218 are configured to accept or receive metal plating during an electro- or electroless-plating process. In this manner, regions of the polymer structure 200 may be selectively metallized depending on the composition, spatial arrangement, and ratio of the first and second photo-monomers 207, 218.

Accordingly, in the illustrated embodiment of FIG. 2C, the polymer structure includes upper and lower regions formed from the first photo-monomer 207 that are configured to reject or inhibit electroless metal plating and an intermediate or central region formed from the second photo-monomer 218 that is configured to accept electroless metal plating (e.g., the struts 214, 232 and nodes 215, 216, 233 in the first and third regions of the polymer structure 200 that were formed from the first photo-monomer 207 are configured to reject or inhibit metal plating and the struts 225 and nodes 226 in the second region of the polymer structure 200 that were formed from the second photo-monomer 218 are configured to accept metal plating). Additionally, the first and second photo-monomers 207, 218 may be filled to any suitable heights $h_1$, $h_2$, $h_3$ within the reservoir 204 depending on the desired thicknesses of the regions of the polymer structure 200 that are configured to accept electroless metal plating and the desired thicknesses of the regions of the polymer structure 200 that are configured to reject or inhibit electroless metal plating. Additionally, the heights $h_1$, $h_2$, $h_3$ to which the photo-monomers 207, 214 are filled in the reservoir 204 and the directions along which the light beams 212, 221, 228 are directed through the photo-monomers 207, 214 may be selected depending on the desired features (e.g., nodes or struts) of the polymer structure 200 that are configured to accept or reject electroless metal plating. For instance, the heights of the photo-monomers in the reservoir may be selected such that the polymer structure 200 is configured to accept electroless metal plating in regions corresponding to the metallized regions 102 of any one of the partially metallized three-dimensional structures 100 illustrated in FIGS. 1A-1K and reject or inhibit electroless metal plating in regions corresponding to the non-metallized regions 103 of any one of the partially metallized three-dimensional structures 100 illustrated in FIGS. 1A-1K.

Suitable methods for manufacturing the polymer structure 200 illustrated in FIG. 2C are described in U.S. patent application Ser. No. 14/461,841 entitled "Stacked Microlattice Materials and Fabrication Processes," filed on Aug. 18, 2014, the entire content of which is incorporated herein by reference.

With reference now to the flowchart illustrated in FIG. 3, the method also includes a task 300 of metallizing the one or more regions of the polymer structure 200 that are configured to accept electroless metal plating (e.g., the method may include a task of electroless metal plating the polymer optical waveguides 225 and the nodes 226 in the second region of the polymer structure 200 that are formed from the second photo-monomer 218). Suitable processes for metallizing polymers are described in ASTM Standard B727-04, 2009, "Standard Practice for Preparation of Plastics Materials for Electroplating," ASTM International, West Conshohocken, Pa., 2009, DOI: 10.1520/B0727-04R09, www.astm.org, the entire content of which is incorporated herein by reference. In one embodiment, the task 300 of metallizing the polymer structure 200 includes a task 310 of cleaning or degreasing the polymer structure 200 by any suitable process, such as, for instance, with a solvent rinse or a detergent/alkaline cleaner, to remove any surface contamination that would otherwise reduce the efficacy of subsequent tasks of the metallizing process. The task of metallizing the polymer structure 200 may also include a task of rinsing the polymer structure 200 with de-ionized water (DIW) to prevent cross-contamination.

The task 300 of metallizing regions of polymer structure 200 also includes a task 320 of conditioning the polymer structure 200 by any suitable process, such as, for instance, immersing the polymer structure 200 in either an acidic bath or an organic conditioning bath. Conditioning the polymer structure 200 is configured to prepare the polymer structure 200 for the next task 330 of etching the polymer structure 200.

The task 330 of etching the polymer structure 200 includes immersing the polymer structure 200 in an etchant solution, such as a heated acidic oxidative solution (e.g., a mixture of chromic and sulfuric acid in DIW) or a basic oxidative chemical solution (e.g., potassium permanganate and sodium hydroxide in DIW). The DIW may be used to control the concentration of the oxidative solution. The task 330 of etching the polymer structure 200 is configured to roughen the surfaces of the polymer optical waveguides 214, 225, 232 and thereby increase the surface area of the polymer optical waveguides 214, 225, 232. The increased surface area will allow for additional catalyst particles to form on the surfaces of the polymer optical waveguides 214, 225, 232 during a subsequent task of catalyzing the polymer structure. As described below, the additional catalyst particles formed on the polymer structure provide additional sites to initiate the plating reaction in the electroless bath.

With continued reference to the embodiment illustrated in FIG. 3, the task 300 of metallizing one or more regions of the polymer structure 200 includes a task 340 of neutralizing the etched polymer structure 200 by immersing the etched polymer structure 200 in a neutralizing solution that reduces the oxidizer (e.g., the heated acidic oxidative solution or the basic oxidative solution applied during the task 330 of etching the polymer structure 200) and neutralizes the pH. In one embodiment, the task 300 of metallizing the polymer structure 200 may also include a task of rinsing the polymer structure 200 with DIW.

With continued reference to FIG. 3, the task 300 of metallizing one or more regions of the polymer structure 200 includes a task 350 of catalyzing the polymer structure 200. The catalyst is configured to catalyze the reaction necessary to deposit the plating metal (e.g., copper, nickel, palladium, gold, silver, zinc, cobalt, chromium, platinum, or iron) onto the surface of the polymer structure 200. The task 350 may also include agitating the catalyzing solution and flipping the polymer structure 200 one or more times during the task of immersing the etched polymer structure 200 in the catalyzing solution. The task 300 of metallizing the polymer structure 200 may also include a task of pretreating the etched polymer structure 200 before the task 350 of catalyzing the polymer structure 200.

The task 300 of metallizing one or more regions of the polymer structure 200 also includes a task 360 of immersing the polymer structure 200 in an accelerator solution. This task 360 of immersing the polymer structure 200 in an accelerator is configured to remove any contaminants on the catalyst, which was deposited onto the surface of the polymer structure 200 during the task 350 of catalyzing the polymer structure 200. Removing the contamination from the catalyst surface is configured to accelerate the metal plating reaction at the activated sites during a task of immersing the polymer structure in an electroless bath, as described below.

Still referring to FIG. 3, the task 300 of metallizing one or more regions of the polymer structure 200 includes a task 370 of immersing the polymer structure 200 in an electroless bath including a desired metal salt, a reducing agent, and additives to assist the plating reaction. The electroless bath may include any suitable metal salt depending on the desired plating metal (e.g., copper, nickel, palladium, gold, silver, zinc, cobalt, chromium, platinum, or iron). The plating process is triggered auto-catalytically on the activated sites on the surface of the polymer structure 200. The task 300 of metallizing the polymer structure 200 may also include a task of rinsing the plated polymer structure with DIW and then drying the plated polymer structure following the task 370 of immersing the polymer structure in the electroless bath. Additionally, in one embodiment, the task 300 of metallizing the polymer structure 200 may include a task of rinsing the polymer structure 200 in DIW following each of the above-referenced tasks 310-370 to prevent cross-contamination.

As described above, the first photo-monomer 207 may be selected such that the polymer optical waveguides 214, 232 and the nodes 215, 216, 233 formed from the first photo-monomer 207 are configured to reject or inhibit metal plating during the task 300 of metallizing the polymer structure 200, and the second photo-monomer 218 may be selected such that the polymer optical waveguides 225 and the nodes 226 formed from the second photo-monomer 218 are configured to accept or receive metal plating during the task 300 of metallizing the polymer structure 200. As described in detail below, a variety of different photo-monomers may be suitable for rejecting or inhibiting electroless metal plating and these suitable photo monomers may be configured to reject or inhibit metal plating from an electroless plating process in a variety of different manners (i.e., a variety of different chemical mechanisms and properties of the photo-monomer may be utilized to inhibit or reject electroless metal plating). A person of ordinary skill in the art will appreciate that any suitable photo-monomer composition may be selected depending on the desired receptivity or unreceptivity to metal plating of the polymer optical waveguides formed from the photo-monomer.

In one embodiment, the composition of the first photo-monomer may be selected such that the first photo-monomer 207 inherently interferes with one or more mechanisms of the electroless metal plating process. For instance, the first photo-monomer 207 may be selected such that the polymer optical waveguides 214, 232 and the nodes 215, 216, 233 formed from the first photo-monomer 207 prevent the reduction of the catalyst onto the surfaces of the polymer optical waveguides 214, 232 and the nodes 215, 216, 233 during the task 350 of catalyzing the polymer structure 200. Preventing the catalyst from reducing onto the polymer optical waveguides 214, 232 and the nodes 215, 216, 233 formed from the first photo-monomer 207 prevents the metal plating from depositing onto the polymer optical waveguides 214, 232 and the nodes 215, 216, 233 during the task 370 of immersing the polymer structure 200 in the electroless bath. In another embodiment, the first photo-monomer 207 may be selected such that the polymer optical waveguides 214, 232 and the nodes 215, 216, 233 formed from the first photo-monomer 207 bind with the catalyst during the task 350 of catalyzing the polymer structure 200 such that the catalyst cannot catalyze the reduction of metal onto the polymer optical waveguides 214, 232 and the nodes 215, 216, 233 during the task 370 of immersing the polymer structure 200 in the electroless bath. In a further embodiment, the first photo-monomer 207 may be selected such that the polymer optical waveguides 214, 232 and the nodes 215, 216, 233 formed from the first photo-monomer 207 oxidize the reducing agent, bind with the reducing agent so that it cannot react, or bind with the metal so that it cannot be reduced onto the polymer optical waveguides 214, 232 and the nodes 215, 216, 233 during the task 370 of immersing the polymer structure 200 in the electroless bath.

Still referring to the embodiment illustrated in FIG. 3, the task 300 of selectively metallizing one or more regions of the polymer structure 200 may include a task 380 of immersing the polymer structure 200 in a solution containing a catalyst inhibitor prior to the task 350 of catalyzing the polymer structure 200. The surfaces of the polymer structure 200 onto which the catalyst inhibitor is deposited are configured to inhibit or prevent the deposition of the catalyst during the task 350 of catalyzing the polymer structure 200. Accordingly, the first photo-monomer 207 may be selected such that the polymer optical waveguides 214, 232 and the nodes 215, 216, 233 formed from the first photo-monomer 207 attract the catalyst inhibitor (i.e., the catalyst inhibitor will be deposited onto the polymer optical waveguides 214, 232 and the nodes 215, 216, 233 formed from the first photo-monomer 207) and the second photo-monomer 218 may be selected such that the polymer optical waveguides 225 and the nodes 226 formed from the second photo-monomer 218 repel the catalyst inhibitor. Thus, during the task 350 of catalyzing the polymer structure 200, the catalyst will deposit only onto the polymer optical waveguides 225 and the nodes 226 that are formed from the second photo-monomer 218. Therefore, during the task 370 of immersing the polymer structure 200 in the electroless bath, the plating metal (e.g., copper, nickel, palladium, gold, silver, zinc, cobalt, chromium, platinum, or iron) will deposit only onto the polymer optical waveguides 225 and the nodes 226 that are formed from the second photo-monomer 218. A person of ordinary skill in the art will appreciate that any suitable catalyst inhibitor may be selected depending on the composition of the polymer structure and the chemical composition of the catalyst selected. This method of selectively plating regions of the polymer structure 200 is referred to herein as the "catalyst poisoning" method.

With continued reference to the embodiment illustrated in FIG. 3, the task 300 of selectively metallizing one or more regions of the polymer structure 200 may include a task 390 of immersing the polymer structure 200 in a solution containing a reaction inhibitor prior to the task 370 of immersing the polymer structure 200 in the electroless bath. The surfaces of the polymer structure 200 onto which the reaction inhibitor is deposited are configured to inhibit or prevent the deposition of the plating metal during the task 370 of immersing the polymer structure 200 in the electroless bath. Accordingly, the first photo-monomer 207 may be selected such that the polymer optical waveguides 214, 232 and the nodes 215, 216, 233 formed from the first photo-monomer 207 attract the reaction inhibitor (i.e., the reaction inhibitor will be deposited onto the polymer optical waveguides 214, 232 and the nodes 215, 216, 233 formed from the first photo-monomer 207) and the second photo-monomer 218 may be selected such that the polymer optical waveguides 225 and the nodes 226 formed from the second photo-monomer 218 repel the reaction inhibitor. Accordingly, during the task 370 of immersing the polymer structure 200 in the electroless bath, the plating metal (e.g., copper, nickel, palladium, gold, silver, zinc, cobalt, chromium, platinum, or iron) will deposit only onto the polymer optical waveguides 225 and the nodes 226 that are formed from the second photo-monomer 218 (i.e., the polymer optical waveguides 225 and the nodes 226 of the polymer structure 200 that do not contain the reaction inhibitor). This method of selectively plating regions of the polymer structure 200 is referred to herein as the "inhibition of metal reaction" method.

According to another embodiment, the first and second photo-monomers 207, 218 may be selected such that the polymer optical waveguides 214, 232 and the nodes 215, 216, 233 formed from the first photo-monomer 207 are configured to etch at a faster rate than the polymer optical waveguides 225 and the nodes 226 formed from the second photo-monomer 218 during the task 330 of etching the polymer structure 200. This disparity in etching rates permits the polymer optical waveguides 225 and the nodes 226 formed from the second photo-monomer 218 to be suitably/properly etched and the polymer optical waveguides 214, 232 and the nodes 215, 216, 233 formed from the first photo-monomer 207 to be over-etched during the task 350 of etching the polymer structure 200. The properly etched polymer optical waveguides 225 and nodes 226 formed from the second photo-monomer 218 are configured to accept catalyst deposition (e.g., the suitably etched polymer optical waveguides 225 and nodes 226 will have the necessary surface roughness and surface energy to allow catalyzation to occur). In contrast, the over-etched polymer optical waveguides 214, 232 and nodes 215, 216, 233 formed from the first photo-monomer 207 are configured to inhibit or prevent proper catalyst deposition during the task 350 of catalyzing the polymer structure 200 (e.g., the excess roughness of the over-etched polymer optical waveguides 214, 232 and nodes 215, 216, 233 may prevent proper catalyst deposition). Accordingly, during the task 370 of immersing the polymer structure 200 in the electroless bath, the plating metal (e.g., copper, nickel, palladium, gold, silver, zinc, cobalt, chromium, platinum, or iron) will deposit only onto the polymer optical waveguides 225 and the nodes 226 that are formed from the second photo-monomer 218. This method of selectively plating regions of the polymer structure 200 is referred to herein as the "over-etched polymer surface" method.

In a further embodiment, the first and second photo-monomers 207, 218 may be selected such that the polymer optical waveguides 214, 232 and the nodes 215, 216, 233 formed from the first photo-monomer 207 are configured to etch at a faster rate than the polymer optical waveguides 225 and the nodes 226 formed from the second photo-monomer 218, which permits the polymer optical waveguides 225 and the nodes 226 formed from the second photo-monomer 218 to be suitably etched and the polymer optical waveguides 214, 232 and the nodes 215, 216, 233 formed from the first photo-monomer 207 to be over-etched during the task 330 of etching the polymer structure 200. However, unlike the "over-etched polymer surface" method described above, the increased etching of the polymer optical waveguides 214, 232 and the nodes 215, 216, 233 formed from the first photo-monomer 207 may not completely inhibit the deposition of the catalyst onto the over-etched polymer optical waveguides 214, 232 and nodes 215, 216, 233. Instead, the increased etching of the polymer optical waveguides 214, 232 and the nodes 215, 216, 233 formed from the first photo-monomer 207 may permit a reduced or limited amount of catalyst to be deposited onto the surface of the over-etched polymer optical waveguides 214, 232 and nodes 215, 216, 233. Accordingly, during the task 370 of the immersing the polymer structure 200 in the electroless bath, the plating metal will deposit onto the surfaces of the over-etched polymer optical waveguides 214, 232 and nodes 215, 216, 233, but the bond between the plating metal and the surface of the over-etched polymer optical waveguides 214, 232 and nodes 215, 216, 233 will be sufficiently weak or poor such that the metal plating may be readily removed. Thus, in one embodiment, the method 300 of partially metallizing the polymer structure 200 may include removing the metal plating on the over-etched polymer optical waveguides 214, 232 and nodes 215, 216, 233 by any suitable process, such as, for instance, by etching or with abrasive techniques using pressurized fluids, such as air, nitrogen, or water. Additionally, the bonds between the metal plating and the suitably etched polymer optical waveguides 225 and nodes 226 formed from the second photo-monomer 218 are suitably strong such that the metal plating on the suitably etched polymer optical waveguides 225 and nodes 226 will not be removed during the task of removing the metal plating on the over-etched polymer optical waveguides 214, 232 and nodes 215, 216, 233. This method of selectively plating regions of the polymer structure 200 is referred to herein as the "increased etch rate-post process" method.

In another embodiment, the first and second photo-monomers 207, 218 may be selected such that the second photo-monomer 218 is configured to polymerize faster than the first photo-monomer 207. In another embodiment, the second photo-monomer 218 may be configured to polymerize at a different wavelength (i.e., a different polymerization initiation wavelength) of light than the first photo-monomer 207. In each of these embodiments, during the task of forming the polymer structure 200 by irradiating the photo-monomers 207, 218 with light beams 212, 221, 228, the polymer optical waveguides 225 formed from the second photo-monomer 218 will form faster than the polymer optical waveguides 214, 232 formed from the first photo-monomer. Additionally, during a task of post-curing the polymer structure 200 (e.g., irradiating the polymer structure 200 with an additional exposure to light (e.g., UV light) at the same or different wavelength as the light exposures 212, 221, 228), the polymer optical waveguides 225 formed from the second photo-monomer 218 will fully cure (i.e., the functional groups will be fully cross-linked), but the polymer optical waveguides 214, 232 formed from the first photo-monomer 207 will remain partially cured (i.e., the functional groups will be partially cross-linked) due to the slower polymerization rate or the different polymerization initiation wavelength of the second photo-monomer 218. In one embodiment, the fully cured, cross-linked polymer optical waveguides 225 are configured to accept electroless metal plating and the partially cured polymer optical waveguides 214, 232 are configured to reject electroless metal plating. Accordingly, during the task 370 of immersing the polymer structure 200 in the electroless bath, the plating metal (e.g., copper, nickel, palladium, gold, silver, zinc, cobalt, chromium, platinum, or iron) will deposit only onto the fully cured polymer optical waveguides 225 formed from the second photo-monomer 218. Thus, the difference in polymerization rate or polymerization initiation wavelength between the first and second photo-monomers 207, 218 enables selectivity over which portions or regions of the polymer structure 200 will metallize.

This method of selectively plating regions of the polymer structure 200 is referred to herein as the "uncured surface inhibition of plating" method. Additionally, in one embodiment, the partially cured polymer optical waveguides 214, 232 are configured to etch at a faster rate than the fully cured polymer optical waveguides 225 during the task 330 of etching the polymer structure 200. Accordingly, the "uncured surface inhibition of plating" method may be used in conjunction with the "over-etched polymer surface" method or the "increased etch rate-post process" method described above to partially metallize the polymer structure 200.

In a further embodiment, the second photo-monomer 218 may be selected such that the polymer optical waveguides 225 and the nodes 226 formed from the second photo-monomer 218 are configured to etch at a suitable rate, and the first photo-monomer 207 may be selected such that the polymer optical waveguides 214, 232 and the nodes 215, 216, 233 formed from the first photo-monomer 207 are configured not to etch during the task 330 of etching the polymer structure 200. As described above, the increased surface roughness of the etched polymer optical waveguides 225 and nodes 226 increases the surface area of the polymer optical waveguides 225 and the nodes 226 and thereby allows additional catalyst particles to deposit onto the surface of the polymer optical waveguides 225 and the nodes 226 during the task 350 of catalyzing the polymer structure 200. The additional catalytic particles deposited onto the surface of the etched the polymer optical waveguides 225 and nodes 226 trigger the metal plating process during the task 370 of immersing the polymer structure 200 in the electroless bath. In contrast, the un-etched polymer optical waveguides 214, 232 and nodes 215, 216, 233 formed from the first photo-monomer 207 are not configured to accept proper catalyst deposition during the task 350 of catalyzing the polymer structure 200 (i.e., the insufficient surface roughness of the un-etched polymer optical waveguides 214, 232 and nodes 215, 216, 233 prevents proper catalyst deposition onto the un-etched polymer optical waveguides 214, 232 and nodes 215, 216, 233). Accordingly, during the task 370 of immersing the polymer structure 200 in the electroless bath, the plating metal (e.g., copper, nickel, palladium, gold, silver, zinc, cobalt, chromium, platinum, or iron) will deposit only onto the polymer optical waveguides 225 and the nodes 226, which are formed from the second photo-monomer 218. This method of selectively plating regions of the polymer structure 200 is referred to herein as the "etch resistant polymer-prevention of catalyst deposition" method.

Suitable methods for metallizing structures are described in Evans A G, et al., "Concepts for Enhanced Energy Absorption Using Hollow Micro-Lattice," International Journal of Impact Engineering (2010), and Tobias Schaedler, et al., "Designing Metallic Microlattices for Energy Absorber Applications," Advanced Engineering Materials (2014), Volume 16, Issue 3, the entire contents of both of which are incorporated herein by reference.

Figure 4:
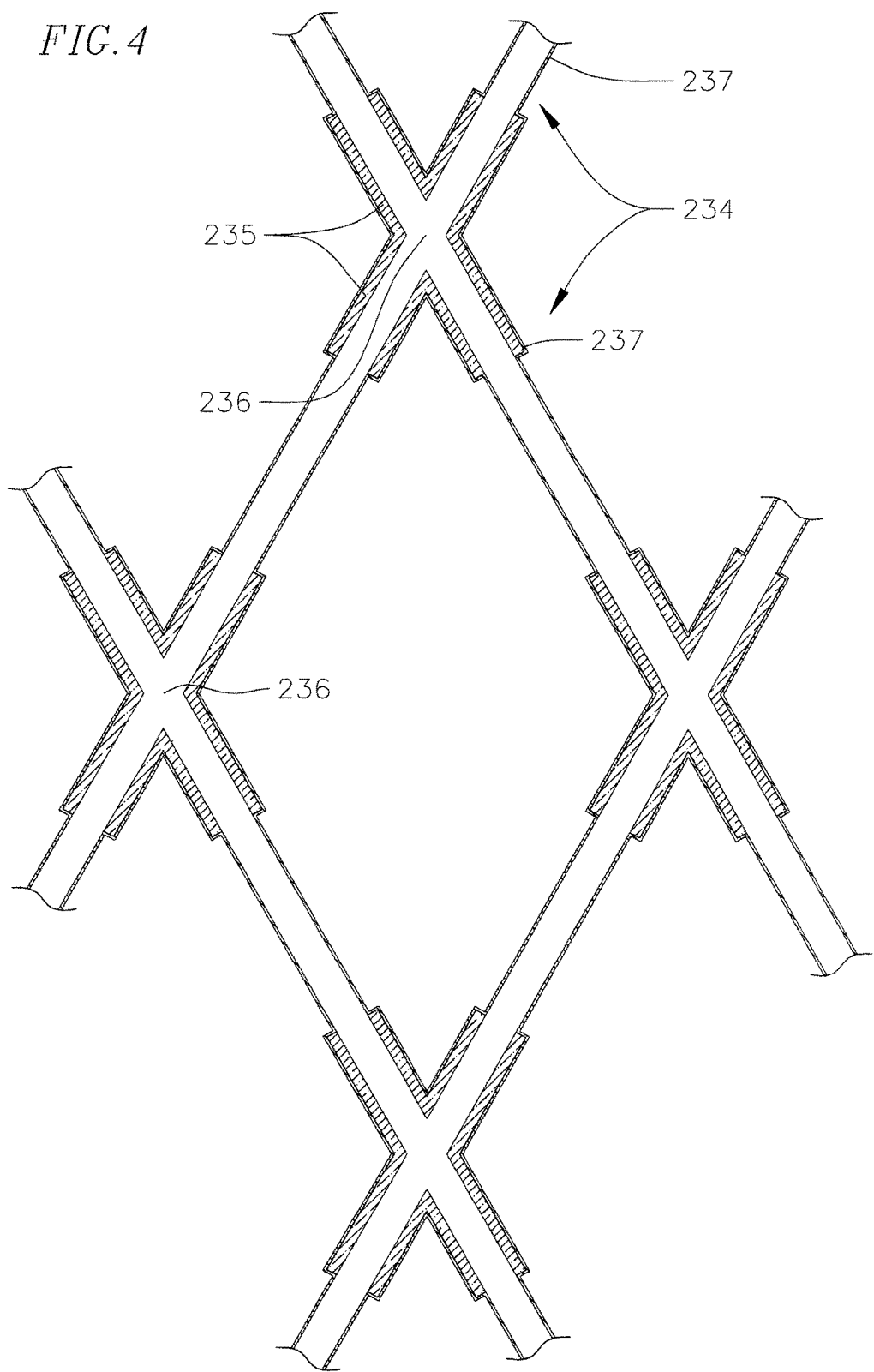
FIG. 4 is a partial side view of a series of interconnected hollow struts according to one embodiment of the present disclosure.

With reference now to the embodiment illustrated in FIG. 4, the method may also include a task of selectively removing at least a portion of the polymer optical waveguides following the task 300 of selectively metallizing one or more regions of the polymer structure 200. The polymer optical waveguides 214, 225, 232 may be removed by any suitable process, such as, for instance, by chemically etching the polymer optical waveguides 214, 225, 232. Selectively removing the polymer optical waveguides 214, 225, 232 leaves a plurality of hollow tubular struts 234 formed out of the metal plating 235 previously deposited onto the polymer optical waveguides 214, 225, 232 during the task 300 of selectively metallizing one or more regions of the polymer structure 200. In an embodiment in which the selectively metallized regions of the polymer structure 200 are interconnected, the hollow tubular struts 234 will be interconnected following the task of removing the polymer optical waveguides 214, 225, 232. In an embodiment in which the selectively metallized regions of the polymer structure 200 are disconnected, separate regions (e.g., the metal plating 235 is applied only to nodes 236 of the polymer structure 200, as illustrated in FIG. 4), the method also includes a task of applying a coating 237 (e.g., a metallic or polymer coating) to the entire polymer structure 200 prior to the task of removing the polymer optical waveguides 214, 225, 232. In an embodiment in which the coating 237 is applied to the entire polymer structure 200, the hollow tubular struts 234 will be thinner in the regions of the polymer structure 200 that rejected metal plating and relatively thicker in the regions where the polymer structure 200 accepted the metal plating 235 (e.g., as illustrated in FIG. 4, the hollow tubular struts 234 may be thicker around the nodes 236 because the nodes 236 are coated by the metal plating 235 as well as the coating 237). The coating 237 may be applied to the polymer structure 200 by any suitable process, such as, for instance, chemical vapor deposition, sputtering, electro-plating, or electroless plating.

Figure 5A:
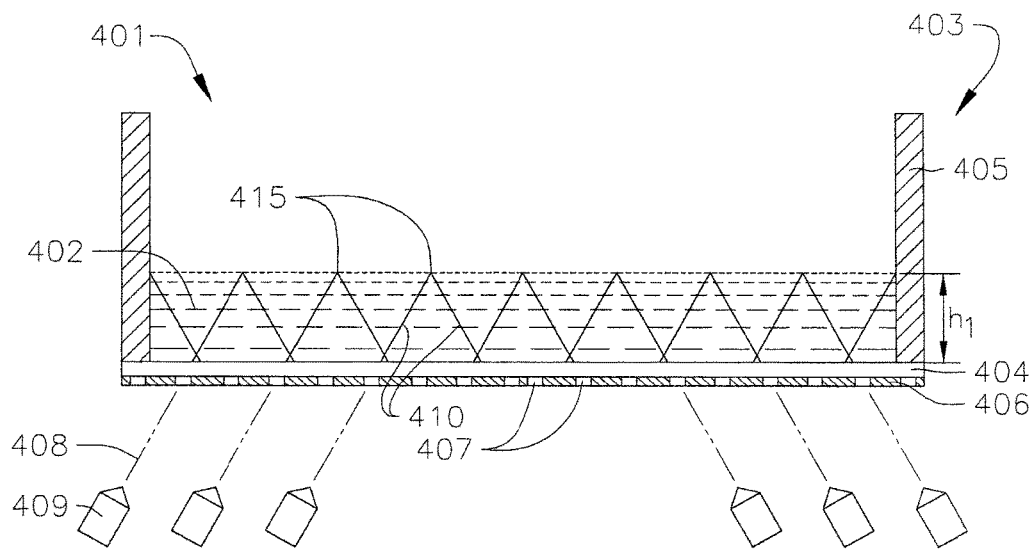
FIGS. 5A-5C illustrate tasks of forming a polymer structure having one or more regions receptive to metal plating and one or more regions unreceptive to metal plating according to another embodiment of the present disclosure.
Figure 5B:
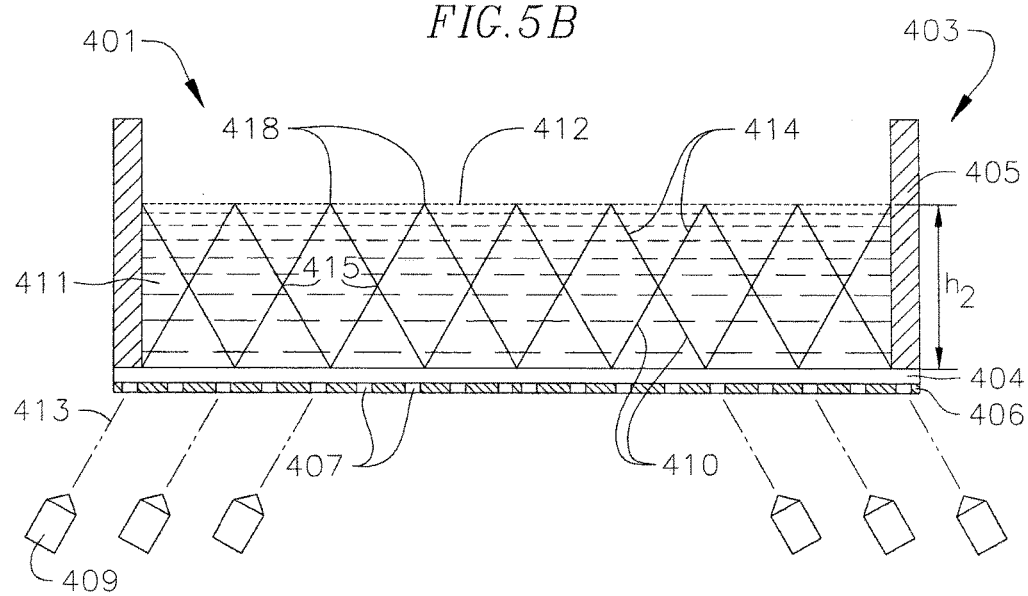
Figure 5C:
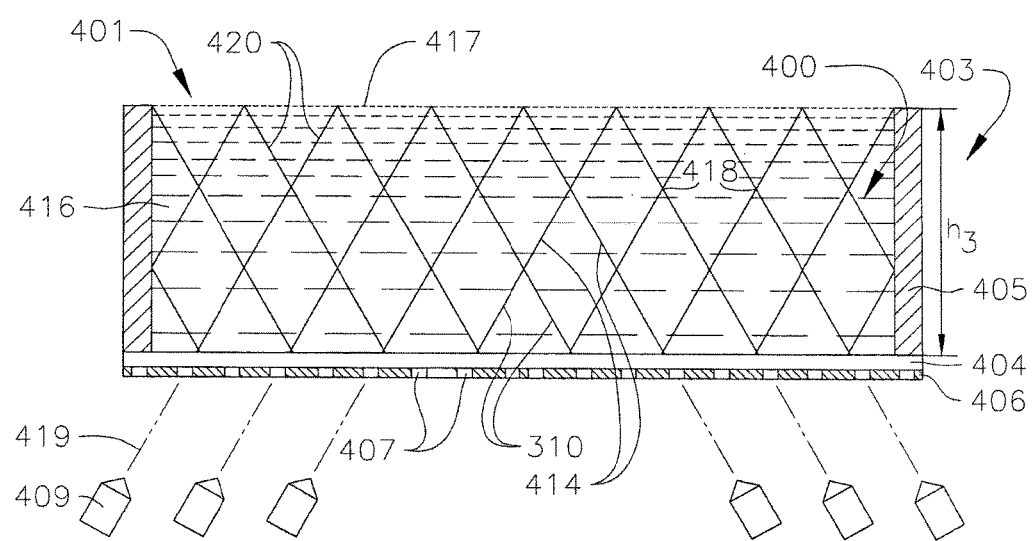

With reference now to FIGS. 5A-5C, a method of manufacturing a partially metallized polymer structure by metal plating a three-dimensional polymer structure 400 having one or more regions configured to accept the metal plating and one or more regions configured to reject or inhibit the metal plating according to another embodiment of the present disclosure will now be described. As illustrated in FIG. 5A, the method includes a task of filling at least a portion of a reservoir 401 with a volume of a first photo-monomer 402. In the illustrated embodiment, the reservoir 401 is defined by a mold 403 having a translucent base 404 and a rim 405 extending up from a periphery of the base 404. The method also includes a task of covering the translucent base 404 of the mold 403 with a mask 406 defining a plurality of apertures 407. The height $h_1$ to which the first photo-monomer 402 is filled in the reservoir 401 may be selected depending on the desired size and configuration of the region of the polymer structure 400 that is configured to accept or reject electroless plating.

The method also includes a task of irradiating the volume of the first photo-monomer 402 by directing a plurality of light beams 408 (e.g., collimated or substantially collimated UV light beams) from one or more light sources 409 up through the apertures 407 in the mask 406 and through the translucent base 404 of the mold 403. Regions of the first photo-monomer 402 that are exposed to the light beams 408 cure (i.e., polymerize) to form a plurality of polymer optical waveguides 410 in a first region of the polymer structure 400. In the illustrated embodiment, the polymer optical waveguides 410 in the first region of the polymer structure 400 are polymerized into a unitary structure, although in one or more alternate embodiments, the polymer optical waveguides 410 may be discrete segments. The light sources 409 may be oriented and positioned based on the desired configuration of the polymer optical waveguides 410 in the first region of the polymer structure 400.

With reference now to FIG. 5B, the method also includes a task of removing the unpolymerized volume of the first photo-monomer 402 from the reservoir 401 and filling the reservoir 401 with a second photo-monomer 411. In the illustrated embodiment, the volume of the second photo-monomer 411 is filled to a height $h_2$ in the reservoir 401 such that an upper surface 412 of the second photo-monomer 411 is above the polymer optical waveguides 410 formed from the first photo-monomer 402 (i.e., the volume of the second photo-monomer 411 is greater than the volume of the first photo-monomer 402 such that the polymer optical waveguides 410 formed from the first photo-monomer 402 are completely submerged in the second photo-monomer 411).

The method also includes a task of directing a plurality of light beams 413 (e.g., collimated or substantially collimated UV light beams) from the light sources 409 through the apertures 407 in the mask 406 and into the second photo-monomer 411. Additionally, in the illustrated embodiment, the light beams 413 are directed through the second photo-monomer 411 at the same angles that the light beams 408 were directed through the first photo-monomer 402. Accordingly, in the illustrated embodiment, the light beams 413 are directed through the polymer optical waveguides 410 formed from the first photo-monomer 402 such that polymer optical waveguides 414 grow or extend up from upper ends 415 of the polymer optical waveguides 410 and into the second photo-monomer 411 (e.g., the light beams 413 pass through the polymer optical waveguides 410 formed from the first photo-monomer 402 and extend into the second photo-monomer 411 to form polymer optical waveguides 414 extending upwards from upper ends 415 of the polymer optical waveguides 410 formed from the first photo-monomer 402). Additionally, in the illustrated embodiment, the polymer optical waveguides 414 extend or grow sufficiently into the second photo-monomer 411 such that the polymer optical waveguides 414 are polymerized together into a unitary, lattice structure. In an alternate embodiment, the height $h_2$ to which the second photo-monomer 411 is filled in the reservoir 401 may be selected such that the polymer optical waveguides 414 formed from the second photo-monomer 411 are discrete, separate segments.

With reference now to the embodiment illustrated in FIG. 5C, the method may also include a task of removing the unpolymerized volume of the second photo-monomer 411 from the reservoir 401 and filling the reservoir 401 with a third photo-monomer 416. In one embodiment, the third photo-monomer 416 may be the same as or similar to the first photo-monomer 402, although in one or more alternate embodiments, the third photo-monomer 416 may be different than the first photo-monomer 402. Additionally, in the illustrated embodiment, the third photo-monomer 416 is filled to a height $h_3$ in the reservoir 401 such that an upper surface 417 of the third photo-monomer 416 is above upper ends 418 the polymer optical waveguides 414 formed from the second photo-monomer 411. The method also includes a task of irradiating the third photo-monomer 416 by directing a plurality of light beams 419 (e.g., collimated or substantially collimated UV light beams) from the light sources 409 up through the apertures 407 in the mask 406. In the illustrated embodiment, the light beams 419 are directed through the third photo-monomer 416 at the same angles that the light beams 413 were directed through the second photo-monomer 411 such that polymer optical waveguides 420 grow or extend up into the third photo-monomer 416 (e.g., the light beams 419 pass through the polymer optical waveguides 414 formed from the second photo-monomer 411 and extend into the third photo-monomer 416 to form polymer optical waveguides 420 extending upwards from upper ends 418 of the polymer optical waveguides 414 formed from the second photo-monomer 411). Additionally, in the illustrated embodiment, the polymer optical waveguides 420 extend or grow sufficiently into the third photo-monomer 416 such that the polymer optical waveguides 420 are polymerized together into a unitary, lattice structure. In an alternate embodiment, the height $h_3$ to which the third photo-monomer 416 is filled in the reservoir 401 may be selected such that the polymer optical waveguides 420 formed from the third photo-monomer 416 are discrete, separate segments.

The above-described tasks of filling the reservoir 401 with a first photo-monomer 402, directing a plurality of light beams 408 into the first photo-monomer 402, filling the reservoir 401 with a second photo-monomer 411 to submerge the polymer optical waveguides 410 formed from the first photo-monomer 402 in the second photo-monomer 411, and directing a plurality of light beams 413 through the polymer optical waveguides 410 formed from the first photo-monomer 402 and into the second photo-monomer 411 may be repeated any suitable number of times depending on the desired thickness of the polymer structure 400 and the number of layers or regions of the polymer structure 400 that are formed from the different photo-monomers.

As described above, one or more of the photo-monomers 402, 411, 416 may be selected such that the polymer optical waveguides 410, 414, and/or 420 formed from those photo-monomers 402, 411, or 416 are receptive to metal plating and one or more of the photo-monomers 402, 411, 416 may be selected such that the polymer optical waveguides 410, 414, and/or 420 formed from those photo-monomers 402, 411, or 416 are configured to reject or inhibit metal plating (i.e., the polymer structure 400 formed from the above-described tasks will have one or regions or layers formed from a polymer material receptive to electroless plating and one or more regions or layers formed from a polymer configured to reject or inhibit electroless plating). The height $h_1$, $h_2$, $h_3$ of each volume of photo-monomer 402, 411, 416 in the reservoir 401 may be varied depending upon the desired thicknesses of the layers or regions of the polymer structure 400 that are receptive to electroless plating and the desired thicknesses of the layers or regions of the polymer structure 400 that are configured to reject or inhibit electroless plating. Regions of the polymer structure 400 that are receptive to metal plating may then be selectively plated according any one of the processes described above, including the "catalyst poisoning" method, the "inhibition of metal reaction" method, the "over-etched polymer surface" method, the "increased etch rate-post process" method, the "uncured surface inhibition of plating" method, or the "etch resistant polymer-prevention of catalyst deposition" method.

Figure 6:
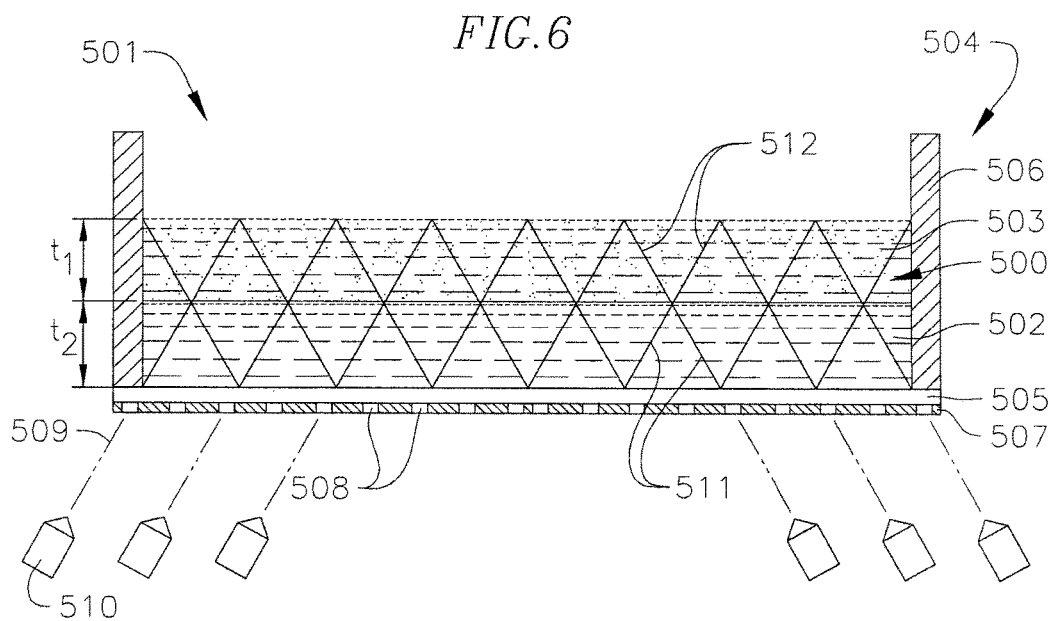
FIG. 6 illustrates tasks of forming a polymer structure having one or more regions receptive to metal plating and one or more regions unreceptive to metal plating according to a further embodiment of the present disclosure.

With reference now to FIG. 6, a method of manufacturing a partially metallized polymer structure by metal plating a three-dimensional polymer structure 500 having one or more regions configured to accept the metal plating and one or more regions configured to reject or inhibit the metal plating according to another embodiment of the present disclosure will now be described. As illustrated in FIG. 6, the method includes filling at least a portion of a reservoir 501 with a volume of a first photo-monomer 502 and layering a volume of a second photo-monomer 503 on top of the first photo-monomer 502. The reservoir 501 is defined by a mold 504 having a translucent base 505 and a rim 506 extending up from a periphery of the base 505. The method also includes a task of covering the translucent base 505 of the reservoir 501 with a mask 507 defining a plurality of apertures 508.

In the illustrated embodiment, the first and second photo-monomers 502, 503 are immiscible photo-monomers such that the first and second photo-monomers 502, 503 remain in separate layers and do not mix or substantially do not mix. The first and second photo-monomers 502, 503 are also configured such that they possess an identical or equivalent index of refraction, the significance of which is described below. Additionally, although in the illustrated embodiment the method includes filling the reservoir 501 with two layers of photo-monomers 502, 503, in one or more alternate embodiments, the method may include tasks of filling the reservoir 501 with any other suitable number of layers of photo-monomers, such as for instance, from three to ten layers, depending on the desired regions or layers of the polymer structure 500 that are configured to reject or inhibit metal plating and the desired regions or layers of the polymer structure 500 that are configured to accept metal plating. Additionally, the first and second layers of the photo-monomers 502, 503 may have any suitable thicknesses $t_1$, $t_2$, respectively, depending on the desired upon the desired thickness of the layer or region of the polymer structure 500 that is receptive to electroless plating and the desired thickness of the layer or region of the polymer structure 500 that is configured to reject or inhibit electroless plating. Additionally, in an alternate embodiment, the method may also include filling the reservoir 501 with more than two different types or kinds of photo-monomer, such as, for instance, three or more different photo-monomers.

With continued reference to FIG. 6, the method also includes a task of irradiating the first and second photo-monomer layers 502, 503. The task of irradiating the first and second photo-monomer layers 502, 503 includes directing a plurality of light beams 509 (e.g., collimated or substantially collimated UV light beams) from one or more light sources 510 up through the apertures 508 in the mask 507, through the translucent base 505 of the mold 504, and up into the first and second photo-monomer layers 502, 503. Regions of the first and second photo-monomer layers 502, 503 that are exposed to the light beams 509 cure (i.e., polymerize) to form a plurality of polymer optical waveguides 511, 512, respectively. Accordingly, the polymer optical waveguides 511, 512 grow or extend up through the first and second photo-monomer layers 502, 503 (e.g., the light beams 509 pass through the first photo-monomer 502 to form polymer optical waveguides 511 and extend into the second photo-monomer 503 to form polymer optical waveguides 512 extending upwards from upper ends of the polymer optical waveguides 511 formed from the first photo-monomer 502). Additionally, because the first and second photo-monomers 502, 503 possess an identical index of refraction, the polymer optical waveguides 511, 512 have the same orientation across the dissimilar first and second photo-monomers 502, 503. In the illustrated embodiment, the polymer optical waveguides 511, 512 are polymerized together into a unitary, lattice structure.

The composition of either the first photo-monomer 502 or the second photo-monomer 503 may be selected such that the polymer optical waveguides 511, 512 formed from that photo-monomer 502 or 503 are receptive to metal plating and the composition of the other photo-monomer 502, 503 may be selected such that the polymer optical waveguides 511, 512 formed from that photo-monomer 502 or 503 are configured to reject or inhibit metal plating. Thus, the polymer structure 500 formed from the above-described tasks will have one or regions or layers formed from a polymer material receptive to electroless plating and one or more regions or layers formed from a polymer configured to reject or inhibit electroless plating. The thickness $t_1$, $t_2$ of each volume of photo-monomer 502, 503 in the reservoir 501 may be varied depending upon the desired thicknesses of the layers or regions of the polymer structure 500 that are receptive to electroless plating and the desired thicknesses of the layers or regions of the polymer structure 500 that are configured to reject or inhibit electroless plating. Regions of the polymer structure 500 that are receptive to metal plating may then be selectively plated according any one of the processes described above, including the "catalyst poisoning" method, the "inhibition of metal reaction" method, the "over-etched polymer surface" method, the "increased etch rate-post process" method, the "uncured surface inhibition of plating" method, or the "etch resistant polymer-prevention of catalyst deposition" method.

Figure 7A:
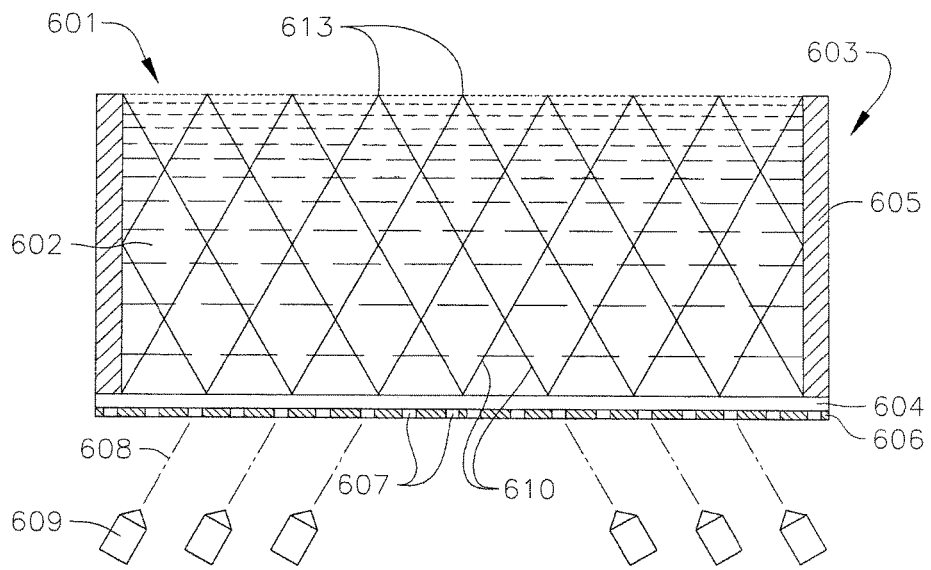
FIGS. 7A-7D illustrate tasks of forming a polymer structure having one or more regions receptive to metal plating and one or more regions unreceptive to metal plating according to another embodiment of the present disclosure.

With reference now to FIGS. 7A-7D, a method of manufacturing a partially metallized polymer structure by metal plating a three-dimensional polymer structure 600 having one or more regions configured to accept the metal plating and one or more regions configured to reject or inhibit the metal plating according to another embodiment of the present disclosure will now be described. As illustrated in FIG. 7A, the method includes a task of at least partially filling a reservoir 601 with a volume of a first photo-monomer 602. The reservoir 601 is defined by a mold 603 having a translucent base 604 and a rim 605 extending up from a periphery of the base 604. The method also includes a task of covering the translucent base 604 of the reservoir 601 with a mask 606 defining a plurality of apertures 607. With continued reference to FIG. 7A, the method also includes a task of irradiating the first photo-monomer 602 by directing a plurality of light beams 608 (e.g., collimated or substantially collimated UV light beams) from one or more light sources 609 up through the apertures 607 in the mask 606, through the translucent base 604 of the mold 603, and up into the first photo-monomer 602. As described above, regions of the first photo-monomer 602 that are exposed to the light beams 608 cure (i.e., polymerize) to form a plurality of polymer optical waveguides 610. In the illustrated embodiment, the polymer optical waveguides 610 are polymerized together into a unitary, lattice structure.

Figure 7B:
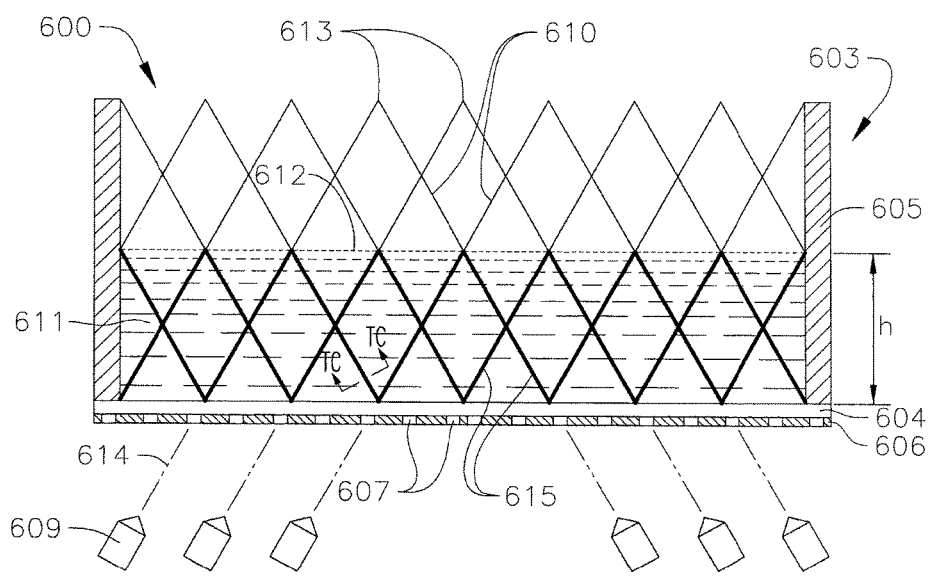

With reference now to the embodiment illustrated in FIG. 7B, the method also includes a task of removing the unpolymerized volume of the first photo-monomer 602 from the reservoir 601 and filling at least a portion of the reservoir 601 with a second photo-monomer 611. In the illustrated embodiment, the second photo-monomer 611 is filled to a height h in the reservoir 601 such that an upper surface 612 of the second photo-monomer is below upper ends 613 of the polymer optical waveguides 610 formed from the first photo-monomer 602 (i.e., the polymer optical waveguides 610 formed from the first photo-monomer 602 are only partially submerged in the second photo-monomer 611). In an alternate embodiment, the second photo-monomer 611 may be filled to any other suitable height h in the reservoir 601. For instance, in one embodiment, the second photo-monomer 611 may be filled to a height h such that the upper surface 612 of the second photo-monomer 611 is substantially flush or level with the upper ends 613 of the polymer optical waveguides 610 formed from the first photo-monomer 602. In another embodiment, the second photo-monomer 611 may be filled to a height h in the reservoir 601 such that the upper surface 612 of the second photo-monomer 611 is above the upper ends 613 of the polymer optical waveguides 610 formed from the first photo-monomer 602.

With continued reference to FIG. 7B, the method also includes a task of irradiating the second photo-monomer 611 by directing a plurality of light beams 614 through the apertures 607 defined in the mask 606. Additionally, in the illustrated embodiment, the light beams 614 are directed through the second photo-monomer 611 at the same angles that the light beams 608 were directed through the first photo-monomer 602. Accordingly, in the illustrated embodiment, the light beams 614 are directed through at least a portion of the polymer optical waveguides 610 formed from the first photo-monomer 602.

Figure 7C:
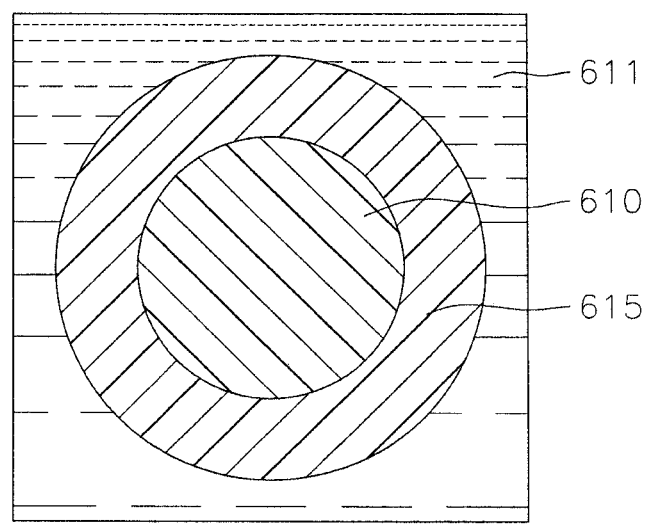
Figure 7D:
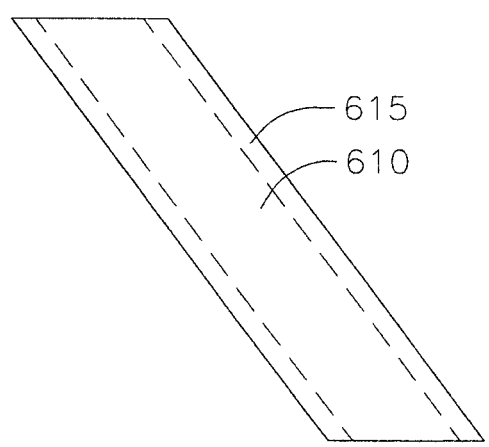

With reference now to the embodiment illustrated in FIGS. 7C and 7D, effluence of the light beams 614 directed through the polymer optical waveguides 610 causes the portions of the polymer optical waveguides 610 submerged in the second photo-monomer 611 to grow outward into the second photo-monomer 611 (e.g., the polymer optical waveguides 610 submerged in the second photo-monomer 611 may grow radially outward into the second photo-monomer 611). As used herein, "effluence" refers to the physical phenomenon that a light beam directed through a medium diffuses or scatters in a direction perpendicular to the direction in which the light beam is directed (e.g., a light beam directed through a medium in an axial direction will diffuse or scatter radially outward). Accordingly, thin-walled polymer shells 615 formed from the second photo-monomer 611 will form around the portions of the polymer optical waveguides 610 submerged in the second photo-monomer 611 (i.e., the polymer optical waveguides 610 formed from the first photo-monomer 602 will define solid cores surrounded by the thin-walled polymer shells 615 formed from the second photo-monomer 611). The portions of the polymer optical waveguides 610 not submerged in the second photo-monomer 611 will remain exposed (i.e., the thin-walled polymer shells 615 formed from the second photo-monomer 611 will not form around the portions of the polymer optical waveguides 610 formed from the first photo-monomer 602 that were not submerged in the second photo-monomer 611). Thicknesses of the thin-walled polymer shells 615 may be controlled by changing the exposure duration and/or the wavelengths of the light beams 614. Accordingly, in one embodiment, the method includes directing the light beams 614 through the polymer optical waveguides 610 for a sufficient duration to achieve the desired thickness of the thin-walled polymer shells 615 formed from the second photo-monomer 611.

The composition of either the first photo-monomer 602 or the second photo-monomer 611 may be selected such that the polymer optical waveguides 610 or the thin-walled polymer shells 615 formed from that photo-monomer 602 or 611 are receptive to metal plating and the composition of the other photo-monomer 602, 611 may be selected such that the polymer optical waveguides 610 or the thin-walled polymer shells 615 formed from that photo-monomer 602 or 611 are configured to reject or inhibit metal plating. Thus, the polymer structure 600 formed from the above-described tasks will have one or regions formed from a polymer material receptive to electroless plating and one or more regions formed from a polymer configured to reject or inhibit electroless plating. The height h of the volume of the second photo-monomer 611 in the reservoir 601 may be varied depending upon the desired thickness of the region of the polymer structure 600 that is receptive to electroless plating and the desired thickness of the region of the polymer structure 600 that is configured to reject or inhibit electroless plating. Regions of the polymer structure 600 that are receptive to metal plating may then be selectively plated according any one of the processes described above, including the "catalyst poisoning" method, the "inhibition of metal reaction" method, the "over-etched polymer surface" method, the "increased etch rate-post process" method, the "uncured surface inhibition of plating" method, or the "etch resistant polymer-prevention of catalyst deposition" method.

Figure 8A:
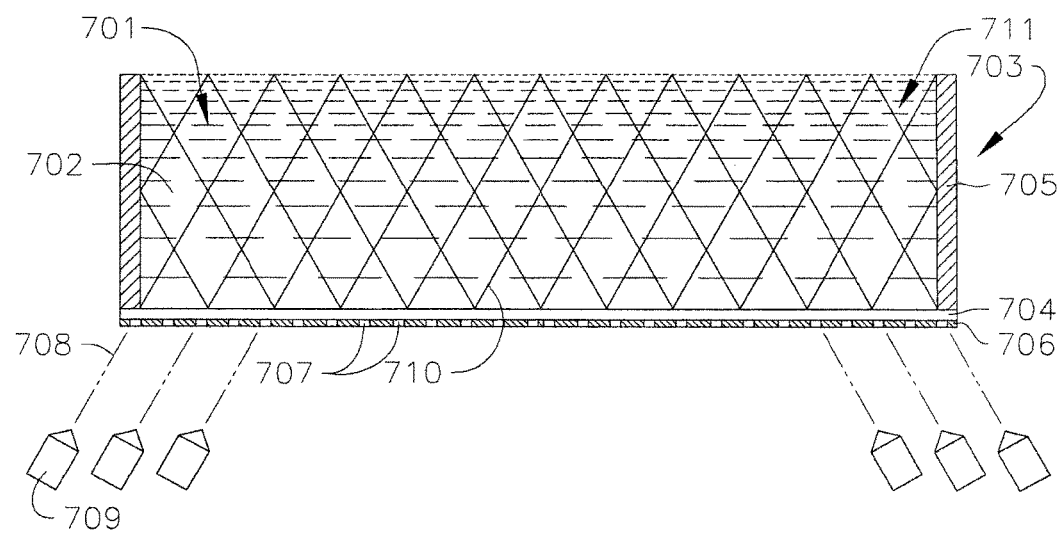
FIGS. 8A and 8B illustrate tasks of forming a polymer structure having one or more regions receptive to metal plating and one or more regions unreceptive to metal plating according to one embodiment of the present disclosure.
Figure 8B:
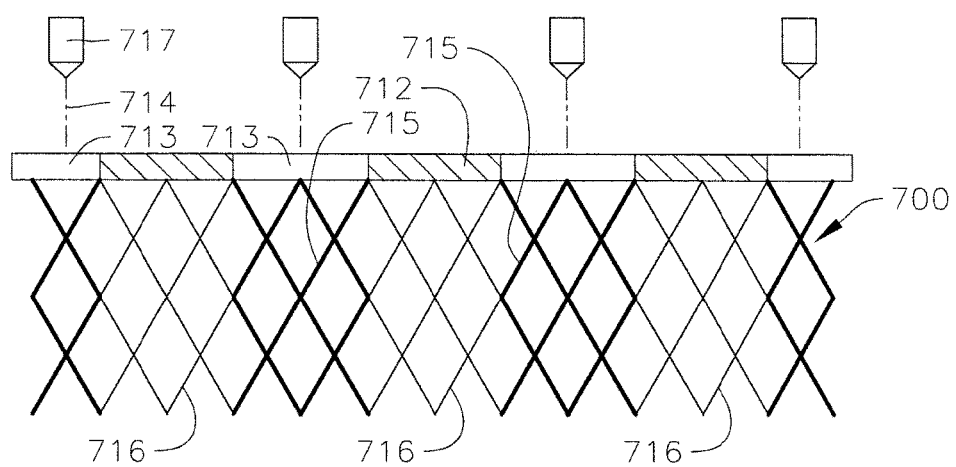

With reference now to FIGS. 8A and 8B, a method of manufacturing a partially metallized polymer structure by metal plating a three-dimensional polymer structure 700 having one or more regions configured to accept the metal plating and one or more regions configured to reject or inhibit the metal plating according to another embodiment of the present disclosure will now be described. As illustrated in FIG. 8A, the method includes a task of at least partially filling a reservoir 701 with a volume of a photo-monomer 702. The reservoir 701 is defined by a mold 703 having a translucent base 704 and a rim 705 extending up from a periphery of the base 704. The method also includes a task of covering the translucent base 704 of the mold 703 with a mask 706 defining a plurality of apertures 707. With continued reference to FIG. 8A, the method also includes a task of irradiating the photo-monomer by directing a plurality of light beams 708 (e.g., collimated or substantially collimated UV light beams) from one or more light sources 709 up through the apertures 707 in the mask 706, through the translucent base 704 of the mold 703, and up into the photo-monomer 702. As described above, regions of the photo-monomer 702 that are exposed to the light beams 708 cure (i.e., polymerize) to form a plurality of polymer optical waveguides 710. In the illustrated embodiment, the polymer optical waveguides 710 intersect each other and are polymerized together into a unitary, lattice structure. Additionally, the polymer optical waveguides 710 of the lattice structure are in a partially cured state following the task of irradiating the photo-monomer 702 with the plurality of light beams 708.

With reference now to FIG. 8B, the method also includes a task of post-curing regions or portions of the partially cured polymer structure 711. In the illustrated embodiment, the task of post-curing regions of the polymer structure 711 includes a task of removing the partially-cured polymer lattice structure 711 from the reservoir 701 and covering an upper end of the partially-cured polymer structure 711 with a mask 712 defining a plurality of apertures 713. The task of post-curing regions of the partially-cured polymer structure 711 also includes irradiating at least a portion of the partially-cured polymer structure 711 with a plurality of light beams 714 (e.g., UV light beams) from one or more light sources 717 directed through the apertures 713 in the mask 712. Irradiating the partially-cured polymer structure 711 is configured to fully cure those portions or regions 715 of the polymer structure 711 that are exposed to the lights beams 714 (i.e., the portions or regions 715 of the partially-cured polymer structure 711 that are exposed to the light beams 714 become fully cured and cross-linked). Additionally, in the illustrated embodiment, the light beams 714 are oriented directly down through the apertures 713 in the mask 712 (e.g., perpendicular or substantially perpendicular to the mask 712) such that the fully-cured regions 715 of the polymer structure 700 are vertical columns. In one or more alternate embodiments, the light beams 714 may be directed through the apertures 713 in the mask 712 at any other suitable angles, such as, for instance, from approximately 15 degrees to approximately 60 degrees, depending on the desired orientation of the fully-cured regions 715 of the polymer structure 700. The method may also include directing the light beams 714 through the apertures 713 in the mask 712 at more than one angle. Additionally, the apertures 713 in the mask 712 may have any suitable shape, size, arrangement, and spacing depending upon the desired shape, size, arrangement, and spacing of the fully cured regions 715 of the polymer structure 700. Portions or regions 716 of the polymer structure 700 that are not exposed to the light beams 714 remain partially cured.

In an alternate embodiment, the task of post-curing regions of the partially-cured polymer structure 711 may be performed while the partially-cured polymer structure 711 remains in the mold 703. For instance, in one embodiment, the task of post-curing regions of the partially-cured polymer structure 711 may include draining the unpolymerized photo-monomer from the reservoir 701 after irradiating the photo-monomer 702 with the plurality of light beams 708, covering the upper end of the partially-cured polymer structure 711 with the mask 712, and irradiating the partially-cured polymer structure 711 with the plurality of light beams 714 to fully cure the exposed regions 716 of the polymer structure 711 while the polymer structure 711 remains in the mold 703.

Accordingly, as illustrated in FIG. 8B, the polymer structure 700 formed from the above-described tasks will have one or more fully-cured (i.e., fully cross-linked) portions or regions 715 and one or more partially-cured portions or regions 716. In one embodiment, the fully-cured regions 715 of the polymer structure 700 are configured to accept electroless metal plating and the partially-cured regions 716 of the polymer structure 700 are configured to prevent or inhibit electroless metal plating. Regions of the polymer structure 700 that are receptive to metal plating may then be selectively plated according any suitable process, such as, for instance, by performing the tasks illustrated in FIG. 3.

In one or more alternate embodiments, the selectively metallized structures of the present disclosure may be manufactured by any other suitable processes, such as, for instance, an additive manufacturing process (e.g., stereolithography, digital light processing, fused deposition, and/or selective laser sintering). Additionally, other suitable methods of manufacturing polymer structures for use with the methods of partially metallizing polymer structures of the present disclosure are described in U.S. patent application Ser. No. 14/650,335 entitled "Multi-Chemistry Microlattice Structures and Methods of Manufacturing the Same", filed on Aug. 18, 2014, now U.S. Pat. No. 9,738,013, the entire content of which is incorporated herein by reference.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A method of manufacturing a structure having at least one plated region and at least one unplated region, the method comprising:
    plating a metal on a polymer structure having a first region accepting the metal and a second region unreceptive to the metal,
    wherein the first region comprises fully-cured, cross-linked polymer optical waveguides, and the second region comprises partially-cured polymer optical waveguides, the partially-cured polymer optical waveguides inhibiting the plating of the metal on the partially-cured polymer optical waveguides of the second region.

2. The method of claim 1, wherein the plating of the polymer structure comprises:
    conditioning the polymer structure;
    etching the polymer structure;
    neutralizing the polymer structure;
    catalyzing the polymer structure;
    immersing the polymer structure in an accelerator; and
    immersing the polymer structure in an electroless bath.

3. The method of claim 1, further comprising:
    irradiating a volume of a photo-monomer with a plurality of light beams to form the partially-cured polymer optical waveguides; and
    irradiating regions of the partially-cured polymer optical waveguides with light beams to form the fully-cured, cross-linked polymer optical waveguides.

4. The method of claim 1, wherein the first region comprises a first polymer composition, and the second region comprises a second polymer composition different than the first polymer composition.

5. The method of claim 1, further comprising etching the polymer structure, the first region of the polymer structure etching at a first rate and the second region of the polymer structure etching at a second rate different than the first rate.

6. The method of claim 1, further comprising forming the polymer structure by irradiating one or more photo-monomers with a plurality of light beams, wherein the polymer structure comprises a plurality of interconnected polymer optical waveguides arranged in a unitary lattice structure.

7. The method of claim 1, further comprising forming the polymer structure by irradiating a volume of a first photo-monomer with a plurality of light beams to form the first region of the polymer structure and irradiating a volume of a second photo-monomer with a plurality of light beams to form the second region of the polymer structure.

8. The method of claim 1, further comprising forming the polymer structure by an additive manufacturing process selected from the group of processes consisting of stereolithography, digital light processing, fused deposition, and selective laser sintering.

9. A method of manufacturing a selectively plated structure, the method comprising:
    irradiating a volume of a first photo-monomer with a plurality of light beams to form a first region of a polymer structure;
    irradiating a volume of a second photo-monomer different than the first photo-monomer with a plurality of light beams to form a second region of the polymer structure coupled to the first region of the polymer structure,
        wherein one of the first and second regions of the polymer structure accepts metal plating and the other one of the first and second regions of the polymer structure rejects metal plating,
        wherein the one of the first and second regions comprises fully-cured, cross-linked polymer optical waveguides, and the other one of the first and second regions comprises partially-cured polymer optical waveguides, and
    plating a metal on the one of the first and second regions of the polymer structure that accepts metal plating, the partially-cured polymer optical waveguides inhibiting the plating of the metal on the partially-cured polymer optical waveguides of the other one of the first and second regions.

10. The method of claim 9, further comprising:
    lifting the first region of the polymer structure out of a reservoir containing an unpolymerized volume of the first photo-monomer;
    filling the reservoir with the second photo-monomer; and
    lowering the first region of the polymer structure into the reservoir to contact the second photo-monomer before the irradiating of the second photo-monomer with the light beams.

11. The method of claim 9, further comprising:
    removing an unpolymerized volume of the first photo-monomer from a reservoir containing the first region of the polymer structure;
    filling the reservoir with the second photo-monomer to a height greater than a height of the first region of the polymer structure; and
    wherein the irradiating of the second photo-monomer comprises directing the light beams through the first region of the polymer structure such that the second region of the polymer structure extends upward from an upper end of the first region of the polymer structure.

12. The method of claim 9, further comprising:
    removing an unpolymerized volume of the first photo-monomer from a reservoir containing the first region of the polymer structure;
    filling the reservoir with the second photo-monomer such that at least a portion of the first region of the polymer structure is submerged in the second photo-monomer; and
    wherein the irradiating of the second photo-monomer comprises directing the light beams through the first region of the polymer structure to form a plurality of thin polymer shells on the portion of the first region of the polymer structure submerged in the second photo-monomer.

13. The method of claim 9, wherein the first and second photo-monomers are immiscible monomers, and the first photo-monomer is layered on top of the second photo-monomer.

14. The method of claim 9, further comprising:
    removing the one of the first and second regions of the polymer structure by etching to form a plurality of interconnected hollow struts.

15. The method of claim 9, wherein:
the irradiating of the first photo-monomer comprises directing the light beams through a plurality of apertures defined in a first mask; and
the irradiating of the second photo-monomer comprises directing the light beams through a plurality of apertures defined in a second mask.

16. The method of claim 1, wherein the plating the metal on the polymer structure comprises simultaneously applying the metal to both the first region and the second region.

* * * * *